(12) United States Patent
Cavieres Pinilla

(10) Patent No.: US 12,199,557 B2
(45) Date of Patent: Jan. 14, 2025

(54) ADAPTOR FOR SPRING-BASED PV MODULE FASTENER

(71) Applicant: The Board of Regents of the University of Oklahoma, Norman, OK (US)

(72) Inventor: Andres F. Cavieres Pinilla, Norman, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 119 days.

(21) Appl. No.: 17/383,254

(22) Filed: Jul. 22, 2021

(65) Prior Publication Data
US 2022/0029579 A1    Jan. 27, 2022

Related U.S. Application Data

(60) Provisional application No. 63/055,745, filed on Jul. 23, 2020.

(51) Int. Cl.
*H02S 30/10* (2014.01)
*F16B 5/06* (2006.01)
*H01R 4/48* (2006.01)

(52) U.S. Cl.
CPC ............ *H02S 30/10* (2014.12); *F16B 5/0685* (2013.01); *H01R 4/48* (2013.01)

(58) Field of Classification Search
None
See application file for complete search history.

(56) References Cited

U.S. PATENT DOCUMENTS

| | | |
|---|---|---|
| 2,968,850 A | 1/1961 | Tinnerman |
| 3,055,686 A | 9/1962 | Havener |
| 3,126,182 A | 3/1964 | Stamper |

(Continued)

FOREIGN PATENT DOCUMENTS

| | | |
|---|---|---|
| DE | 10 2012 208 480 B3 | 5/2013 |
| EP | 1 930 668 A2 | 6/2008 |

(Continued)

OTHER PUBLICATIONS

U.S. Appl. No. 16/757,386, filed Apr. 18, 2020, Cavieres.

(Continued)

*Primary Examiner* — Steven M Marsh
(74) *Attorney, Agent, or Firm* — Wolf, Greenfield & Sacks, P.C.

(57) ABSTRACT

Mounting systems for solar panel assemblies and related methods are generally described. In some embodiments, a clamp adapter may be used to mount a conventional panel support structure of a solar panel assembly to a conventional bracket of a base assembly without the use of bolts in at least some embodiments. The clamp adapter may include a rail slot for receiving the structure, a lower flange for receiving a lower surface of a mounting lip of the bracket, and a lateral flange for receiving an upper surface of the mounting lip. The lower flange may be angled to accommodate a variety of mounting lip angles. In some embodiments, the mounting system may also include a connector configured to mechanically connect the bracket and structure.

7 Claims, 25 Drawing Sheets

(56) References Cited

U.S. PATENT DOCUMENTS

| | | | |
|---|---|---|---|
| 4,557,086 A | 12/1985 | Liefer et al. | |
| 8,590,223 B2 | 11/2013 | Kilgore et al. | |
| 8,745,935 B2 | 6/2014 | DuPont et al. | |
| 10,211,774 B2 | 2/2019 | Zhu | |
| 10,240,820 B2 | 3/2019 | Ash et al. | |
| 10,801,538 B2 | 10/2020 | Legall et al. | |
| 11,552,590 B2 | 1/2023 | Cavieres | |
| 2012/0201601 A1 | 8/2012 | Rizzo | |
| 2013/0011187 A1 | 1/2013 | Schuit et al. | |
| 2013/0102165 A1* | 4/2013 | DuPont | H02S 20/22 439/95 |
| 2015/0263666 A1* | 9/2015 | Powers, III | H02S 20/24 136/251 |
| 2016/0006390 A1* | 1/2016 | Cinnamon | F24S 25/61 248/237 |
| 2016/0282018 A1* | 9/2016 | Ash | F24S 25/636 |
| 2018/0191290 A1* | 7/2018 | Guthrie | H02S 30/00 |
| 2018/0226916 A1* | 8/2018 | Neuhauser | F24S 25/632 |
| 2019/0081469 A1* | 3/2019 | Shea | H02G 3/32 |
| 2019/0149087 A1* | 5/2019 | McPheeters | H02S 30/10 248/68.1 |
| 2019/0186518 A1 | 6/2019 | Legall et al. | |
| 2019/0312546 A1* | 10/2019 | Legall | H02S 20/10 |
| 2019/0363667 A1 | 11/2019 | Braunstein et al. | |
| 2021/0194410 A1* | 6/2021 | Yang | H02S 20/23 |

FOREIGN PATENT DOCUMENTS

| | | |
|---|---|---|
| EP | 3 550 158 A1 | 10/2019 |
| WO | WO 2020/076870 A1 | 4/2020 |

OTHER PUBLICATIONS

[No Author Listed] Fastening and grounding clips for photovoltaic systems. Araymond product Literature. Mar. 2019:1-14.
International Search Report and Written Opinion for International Application No. PCT/US2021/042823, mailed Dec. 27, 2021.
Extended European Search Report dated Jul. 1, 2024 in connection with European Application No. 21846720.7.
EP. 21846720.7, Jul. 1, 2024, Extended European Search Report.

* cited by examiner

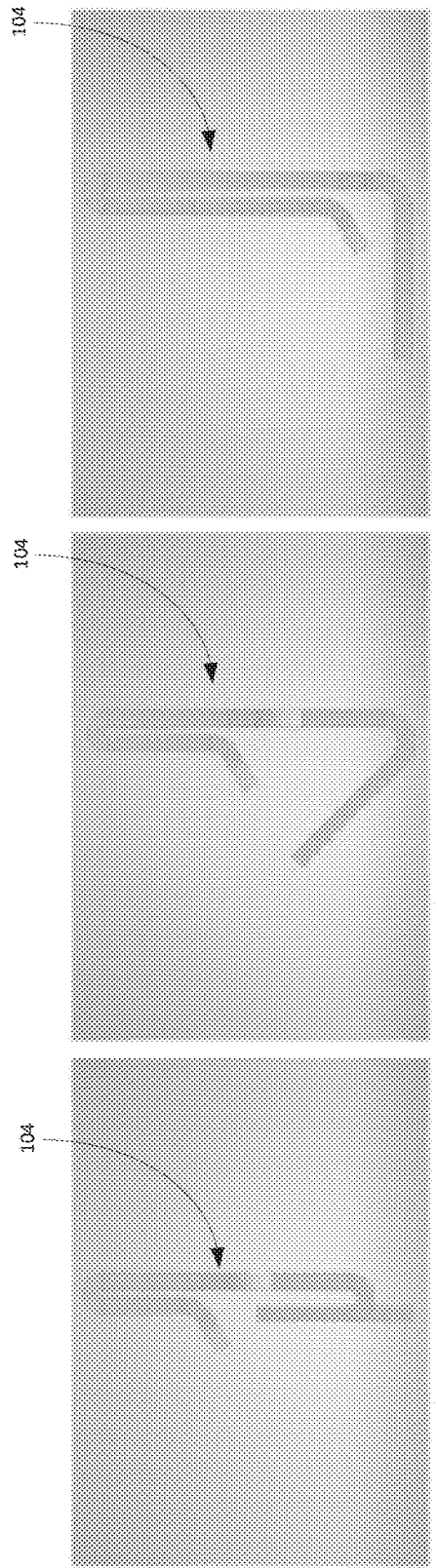
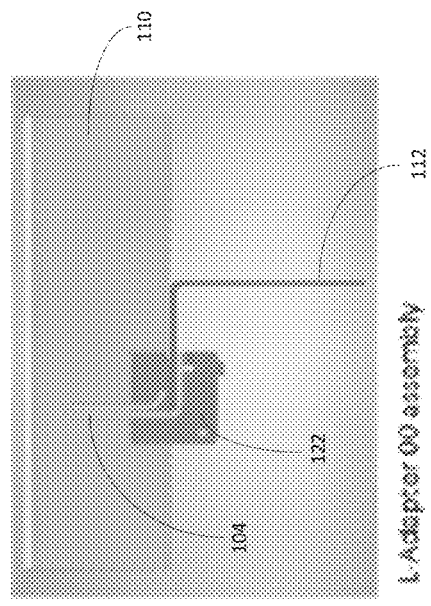
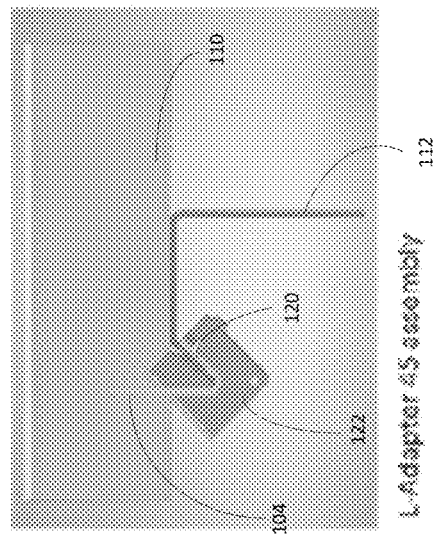
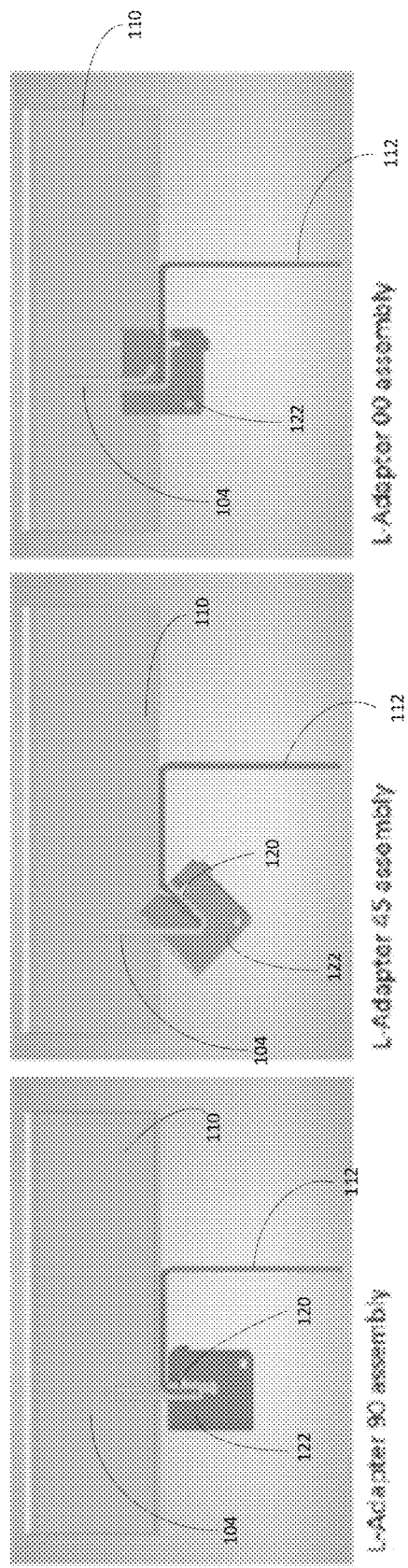
FIG. 7A L Adapter 90
FIG. 7C L Adapter 45
FIG. 7E L Adapter 00
FIG. 7B L Adapter 90 assembly
FIG. 7D L Adapter 45 assembly
FIG. 7F L Adapter 00 assembly

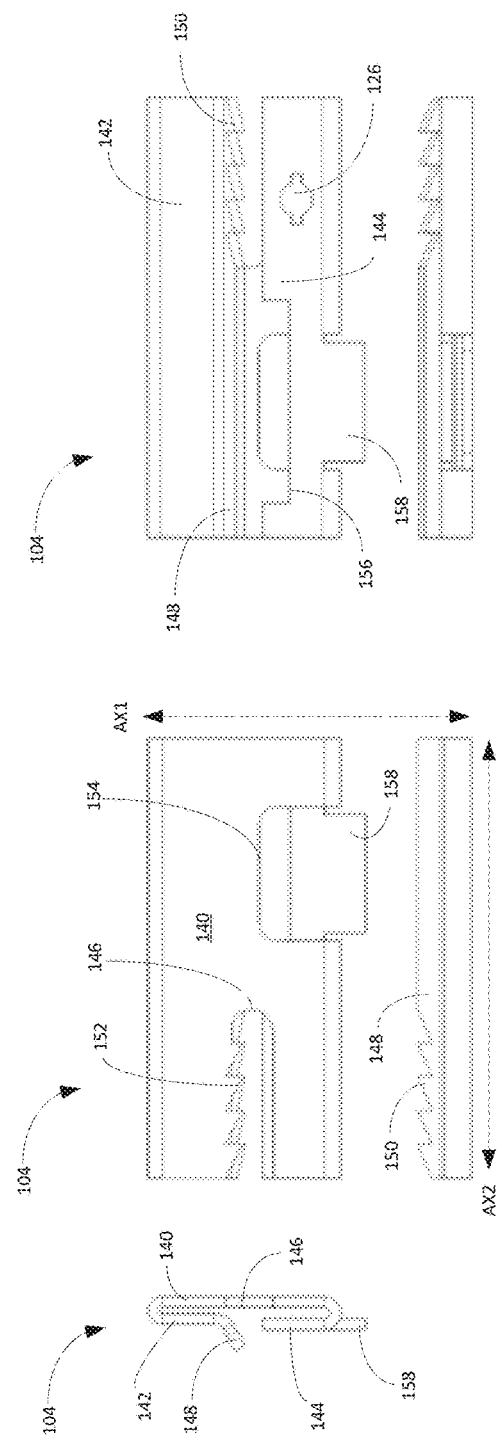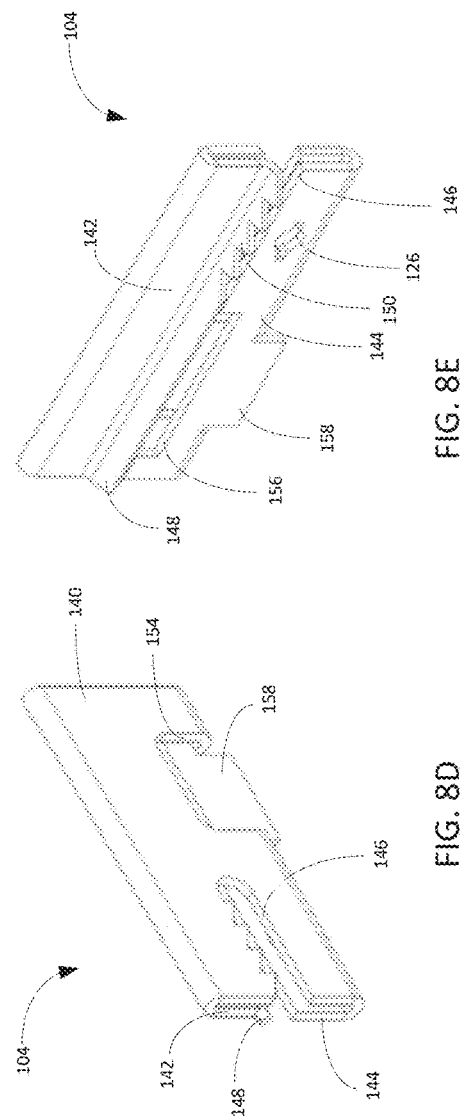

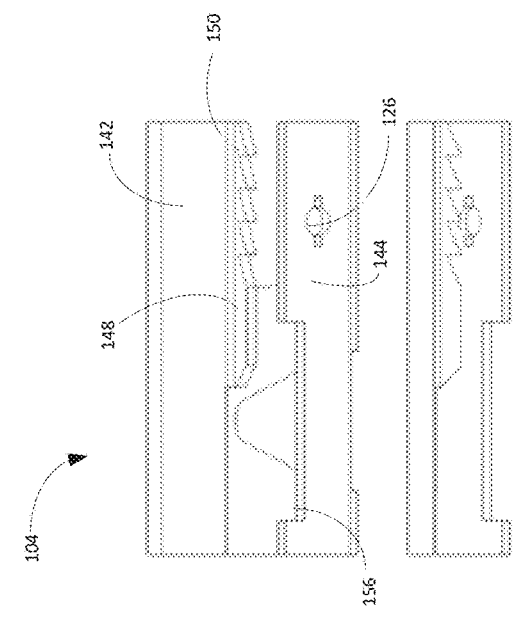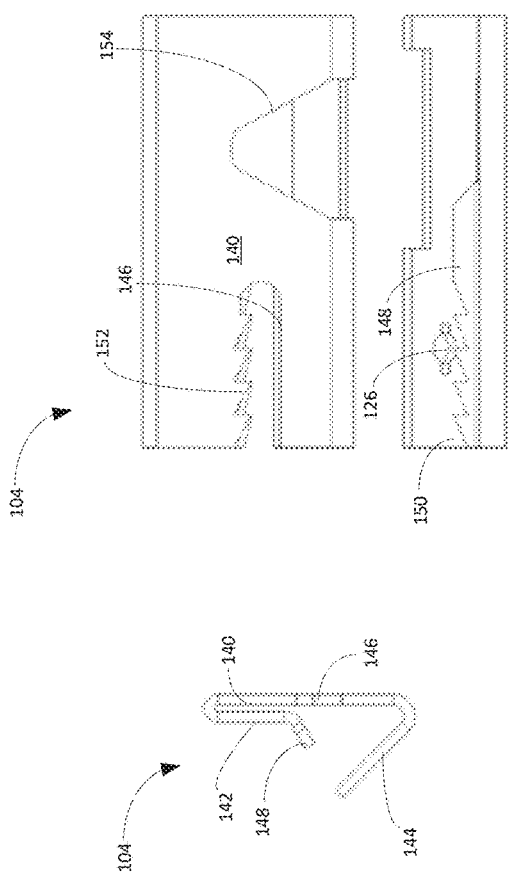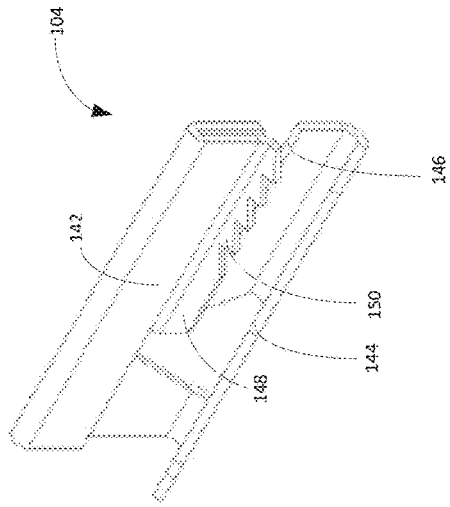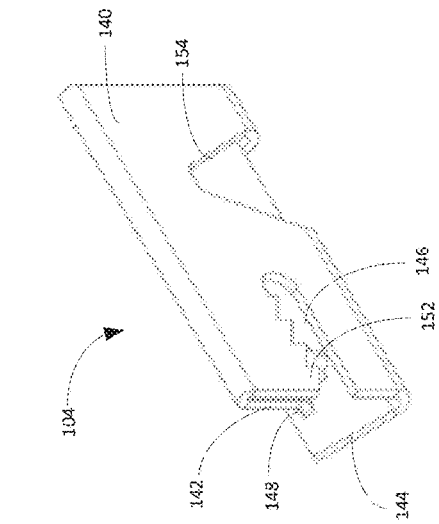
FIG. 10C
FIG. 10E
FIG. 10B
FIG. 10A
FIG. 10D

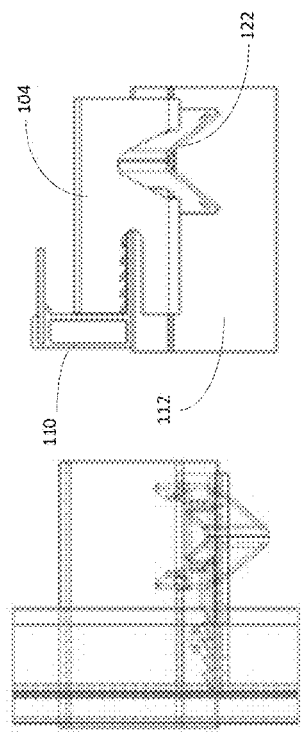
FIG. 11A
FIG. 11B
FIG. 11C
FIG. 11D
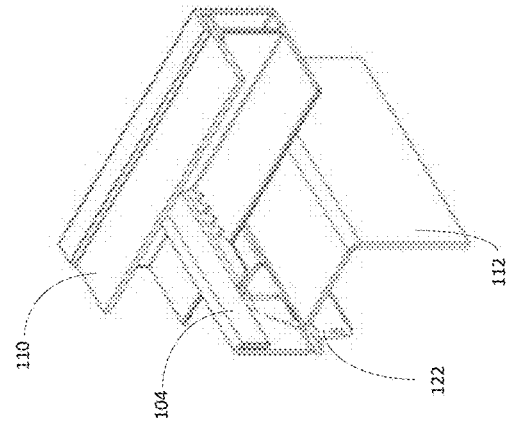
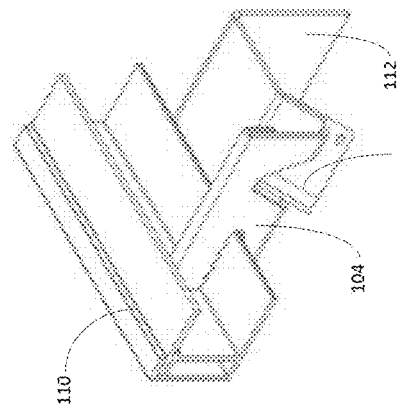
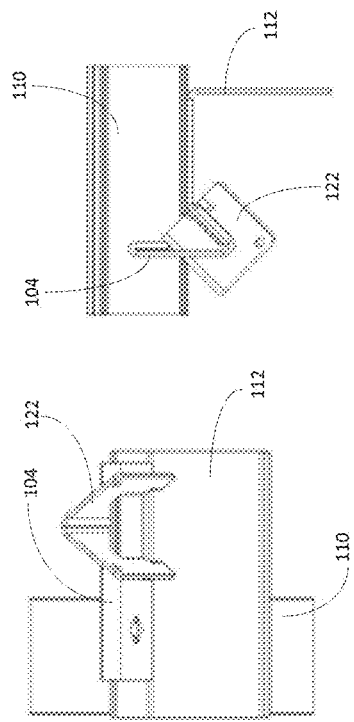
FIG. 11E
FIG. 11F
FIG. 11G
FIG. 11H
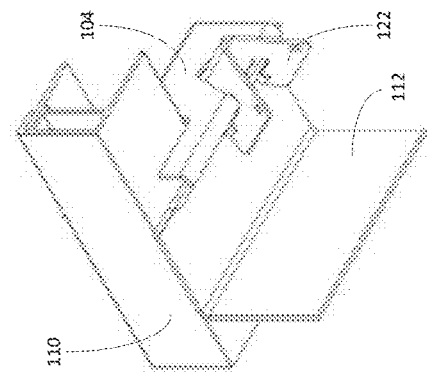
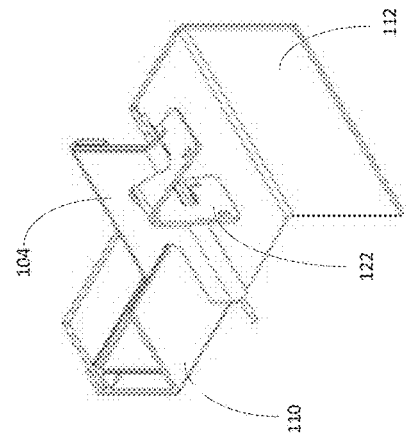

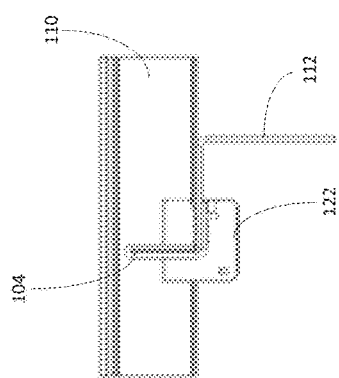
FIG. 13A
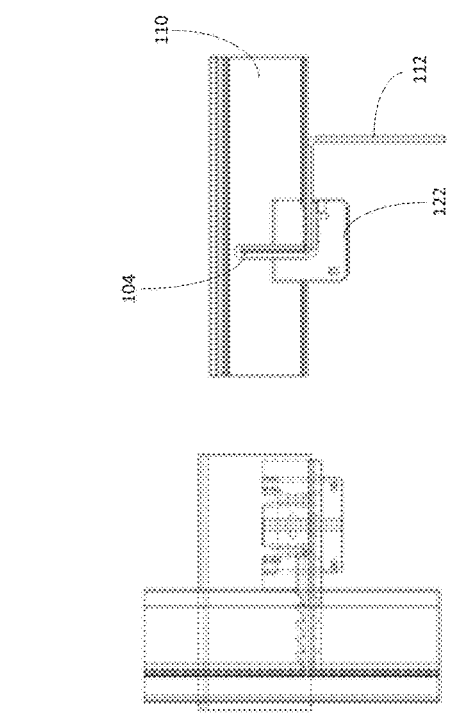
FIG. 13B
FIG. 13C
FIG. 13D
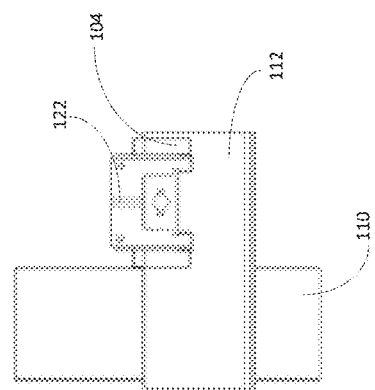
FIG. 13E
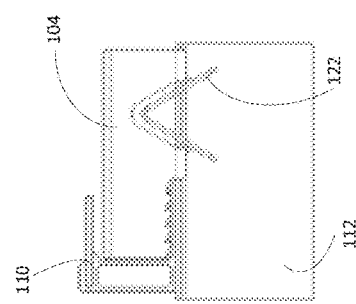
FIG. 13F
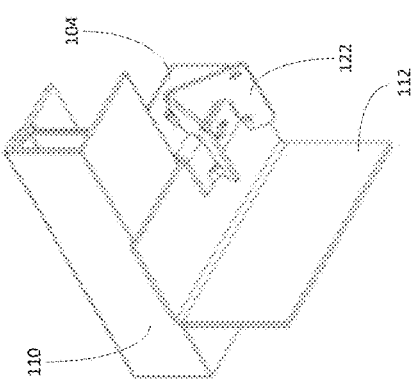
FIG. 13G
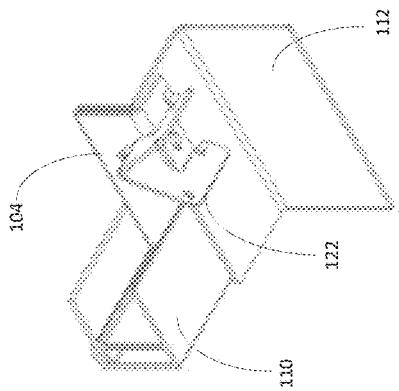
FIG. 13H

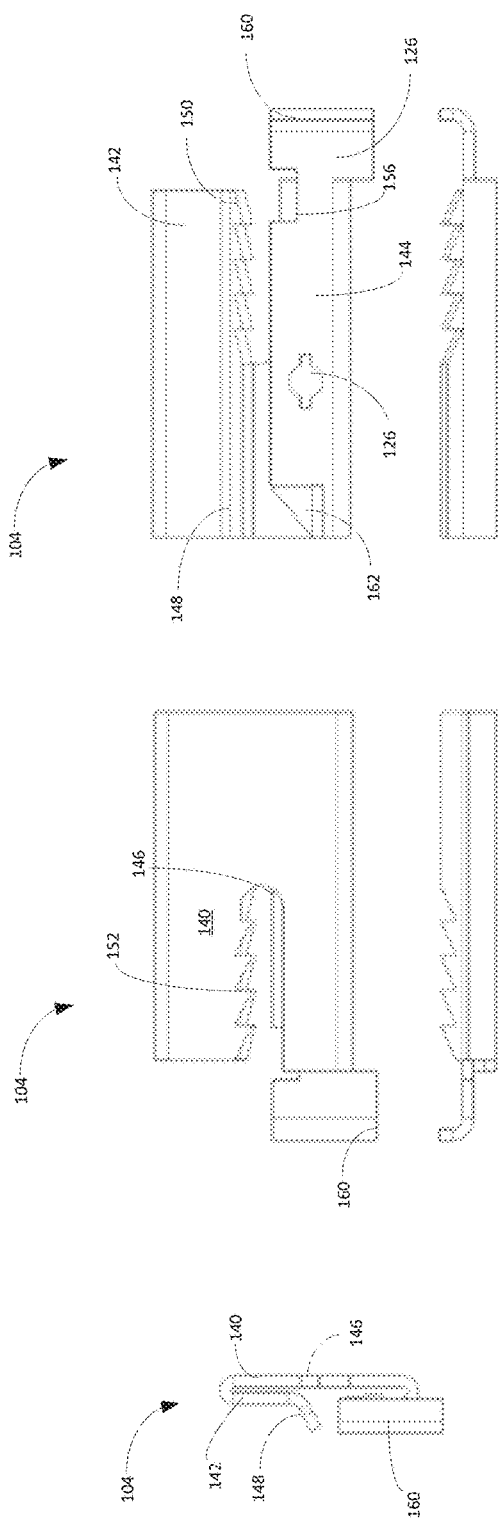
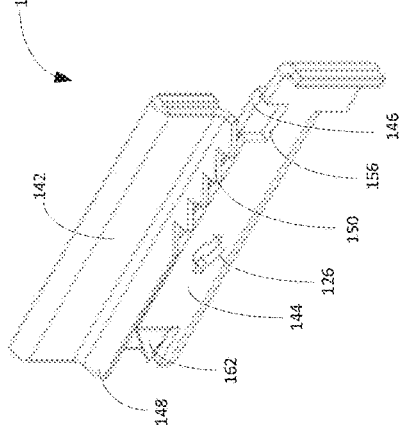
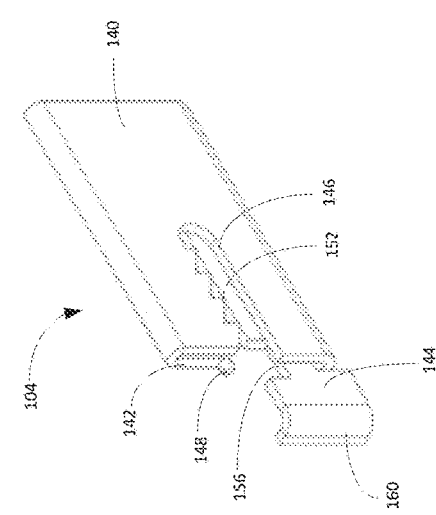
FIG. 14A  FIG. 14B  FIG. 14C  FIG. 14D  FIG. 14E

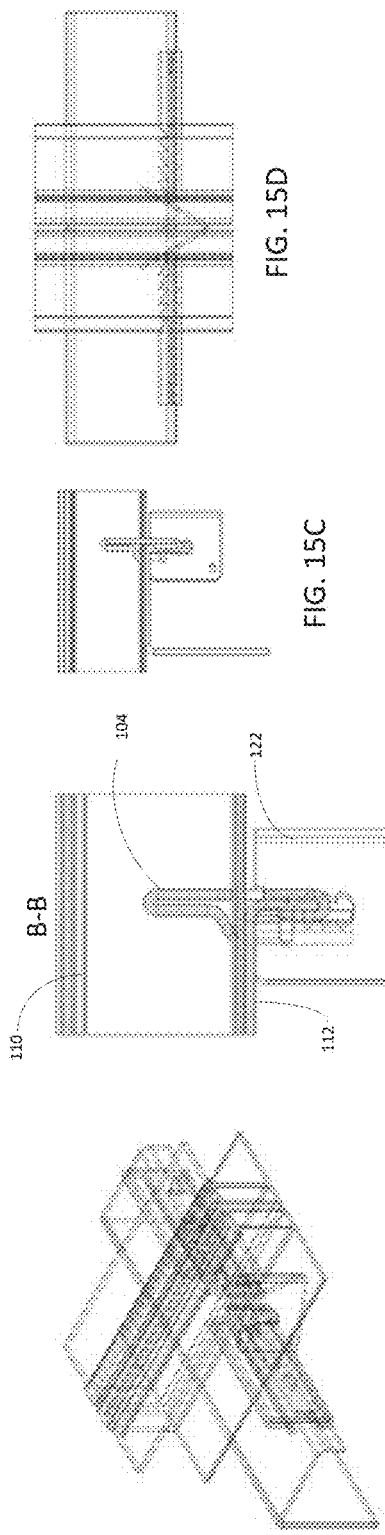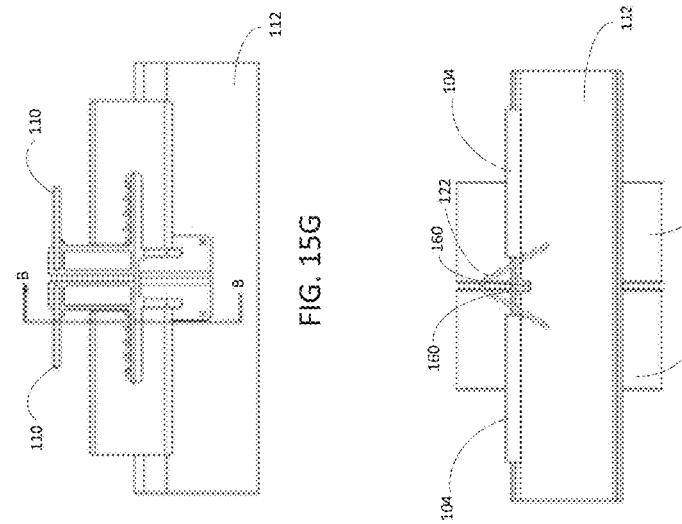

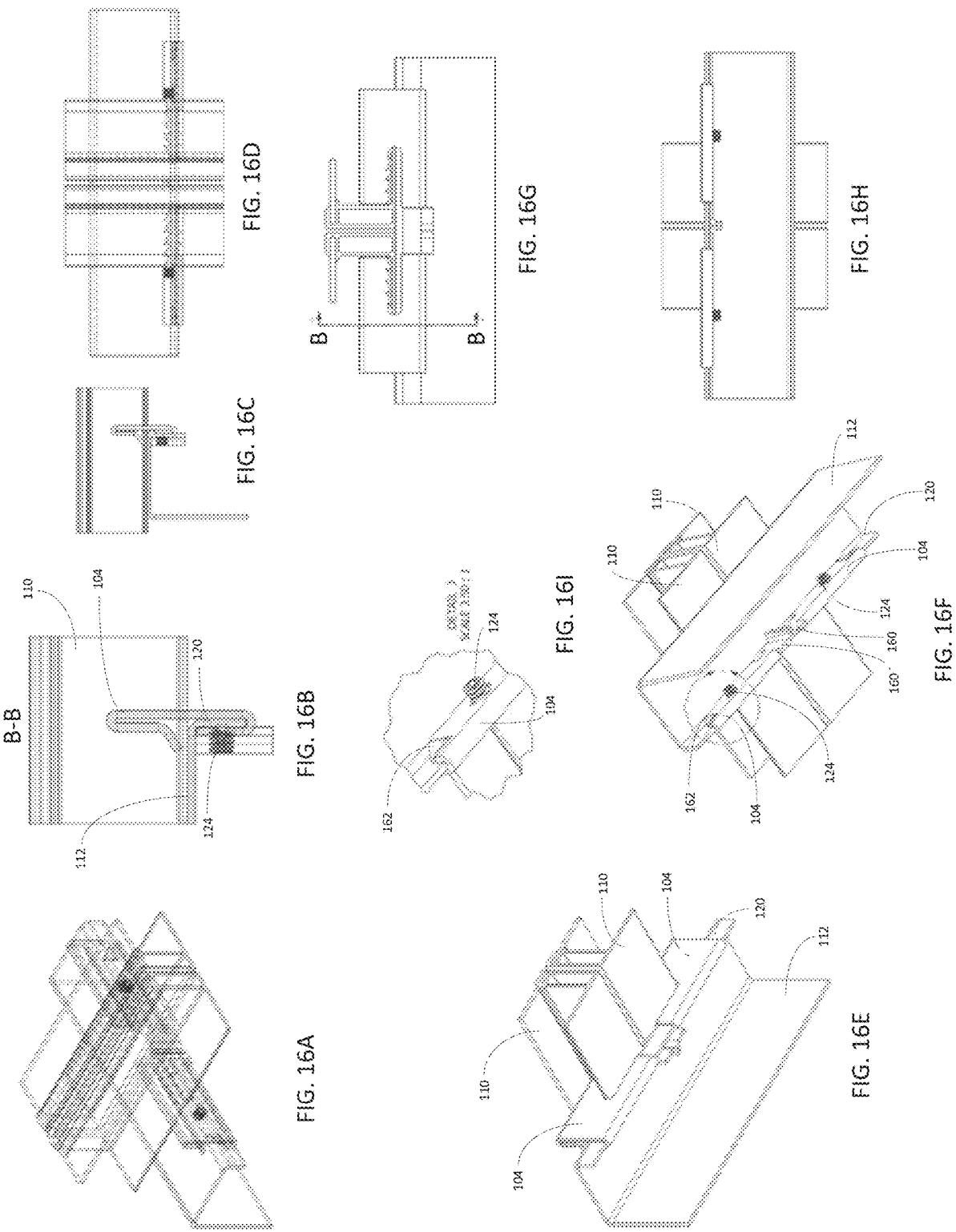

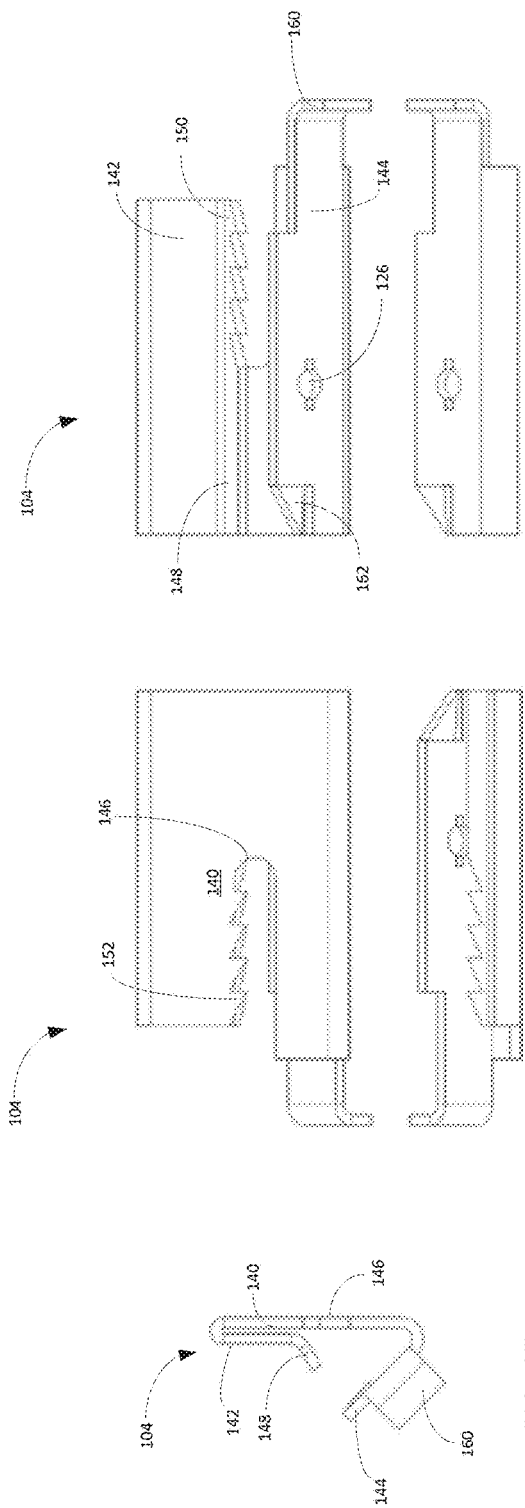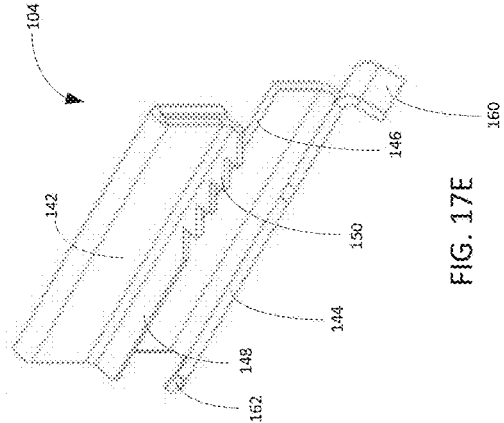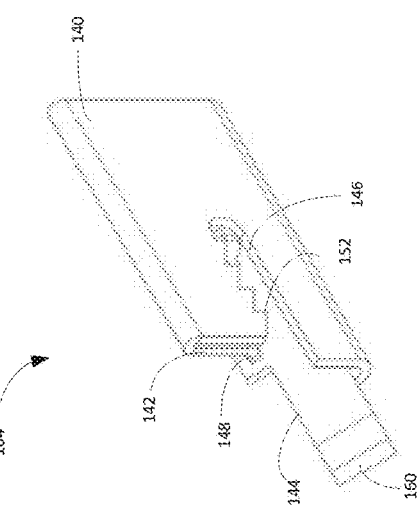

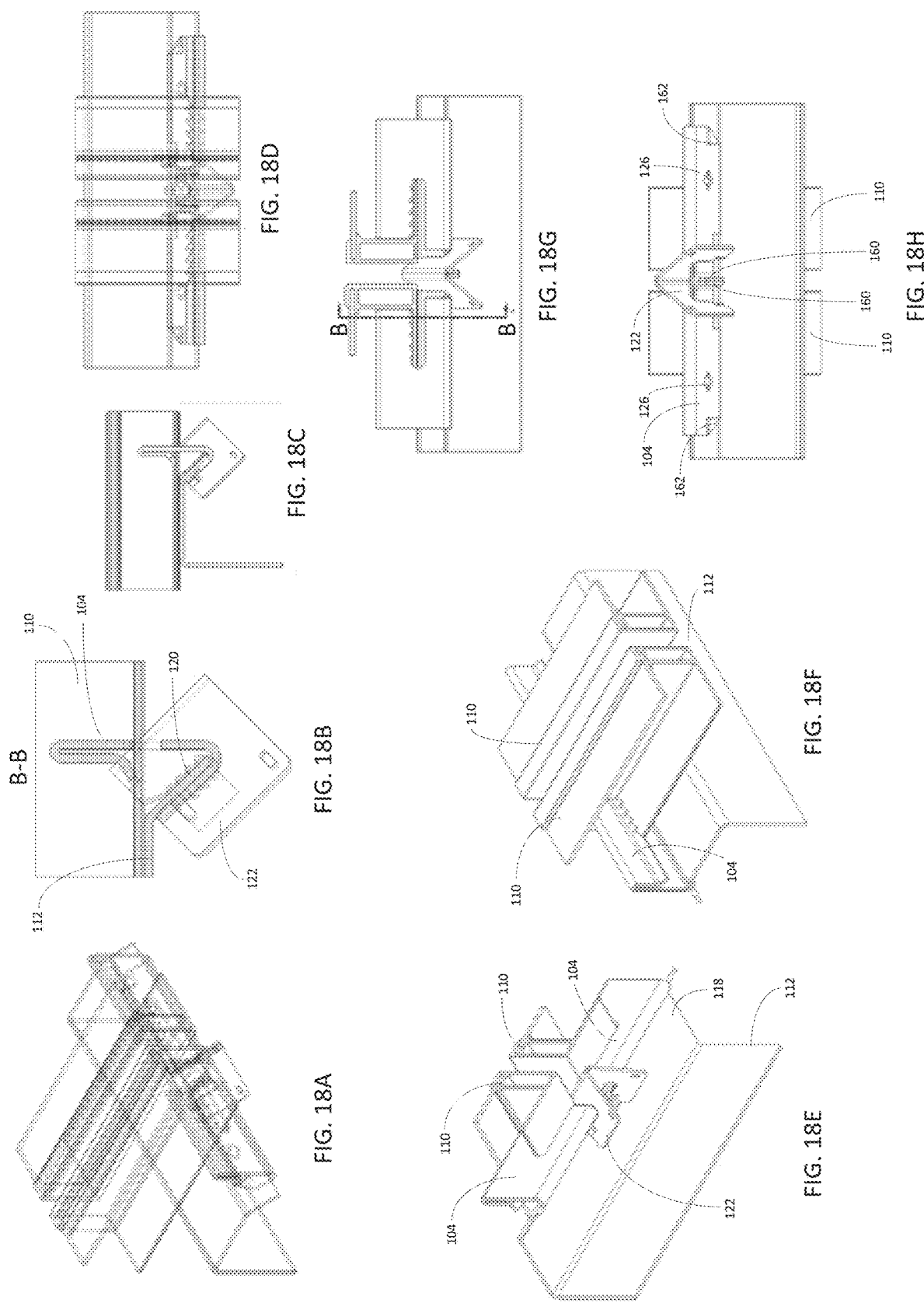

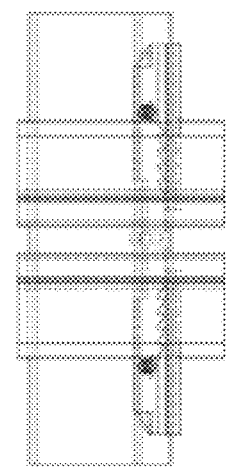
FIG. 19A
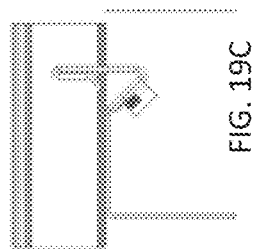
FIG. 19B
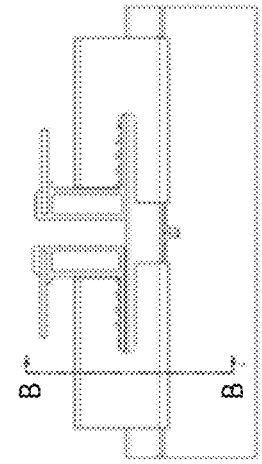
FIG. 19C
FIG. 19D
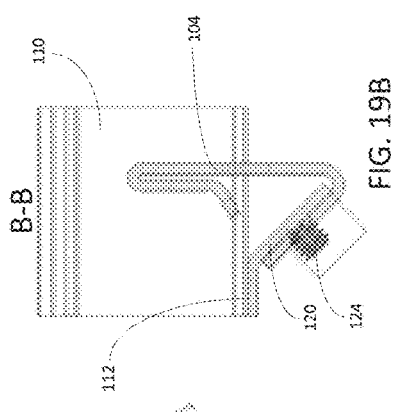
FIG. 19I
FIG. 19E
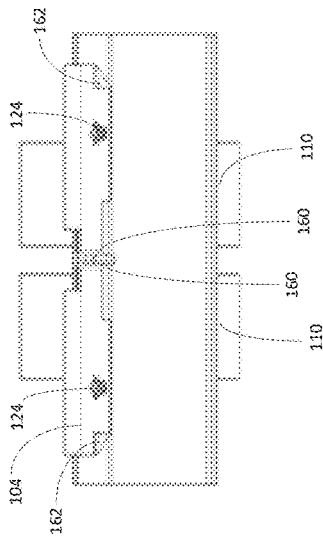
FIG. 19G
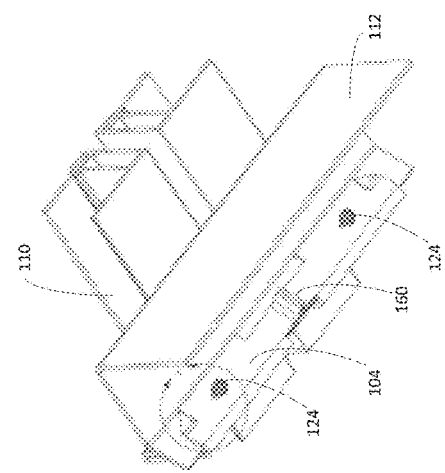
FIG. 19H
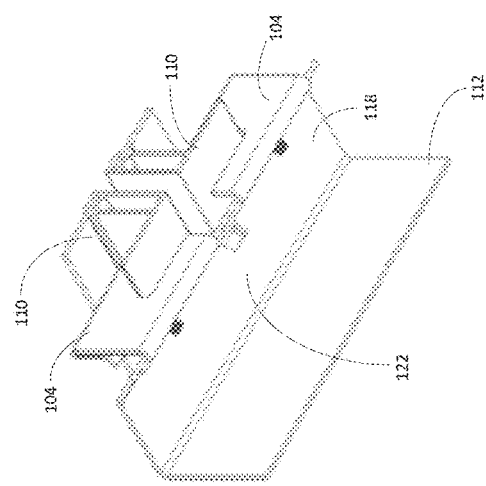
FIG. 19F

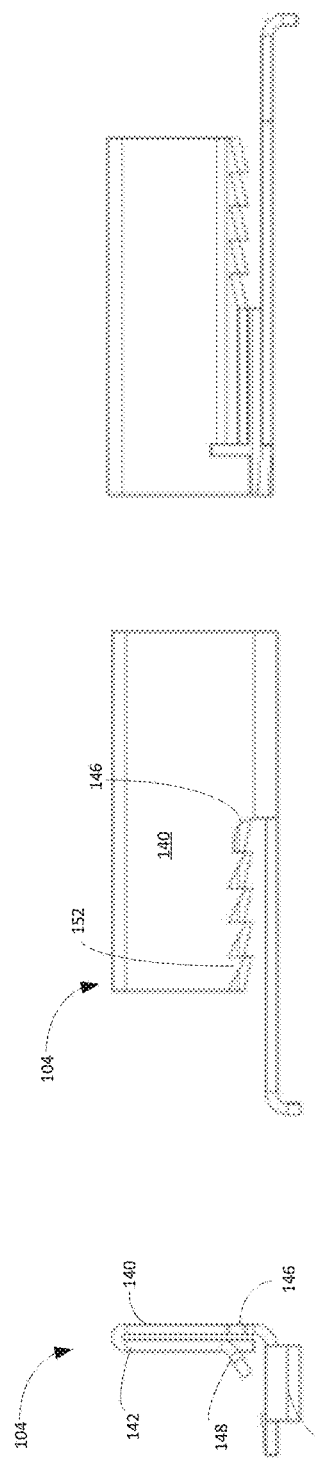
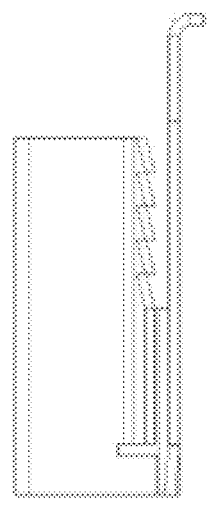
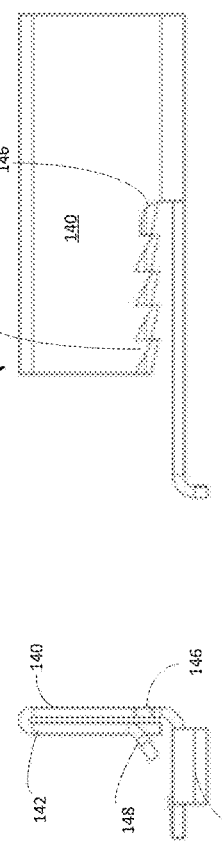
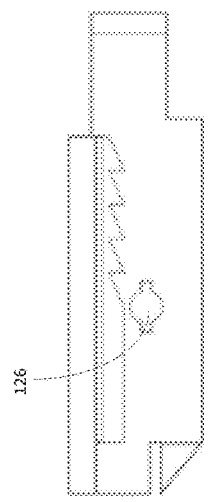
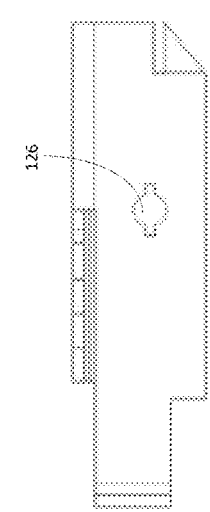
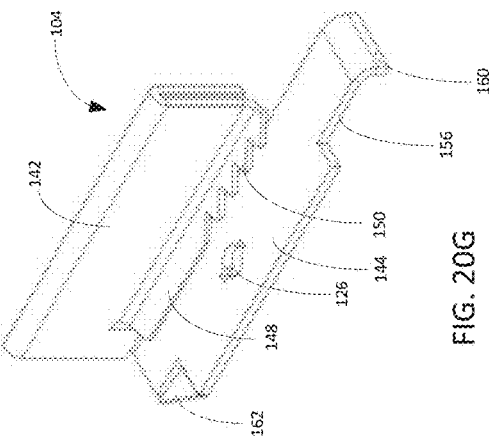
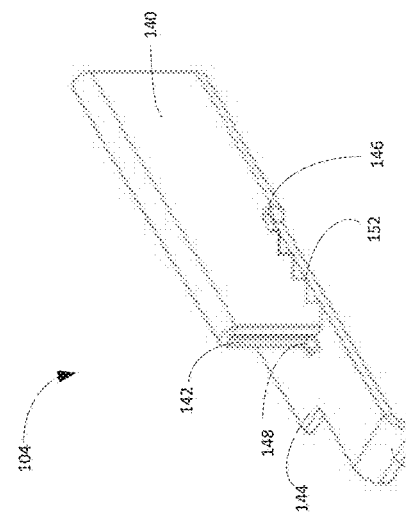

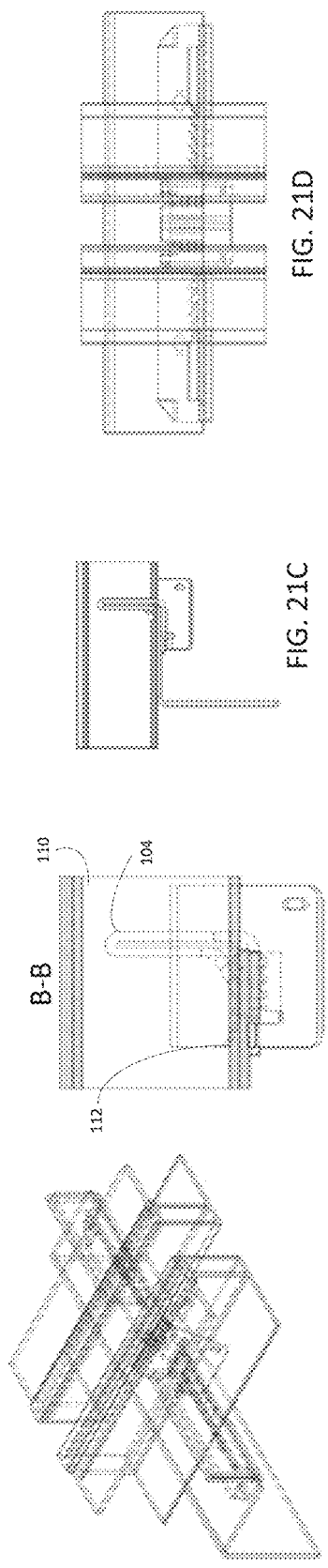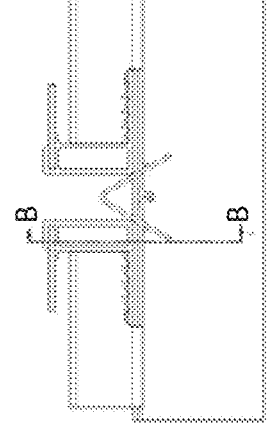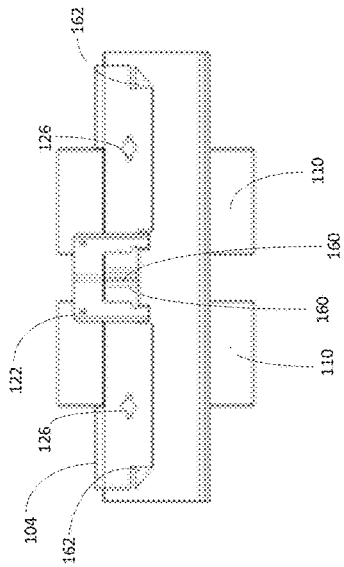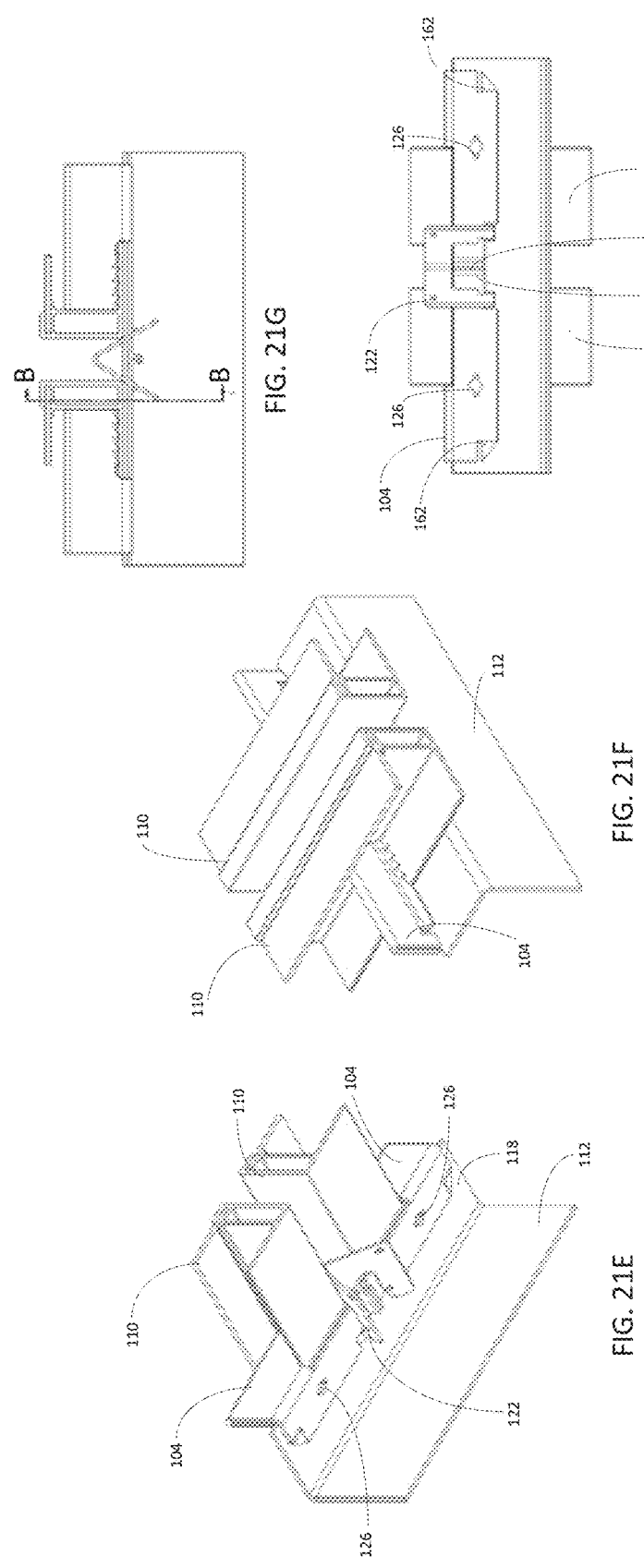

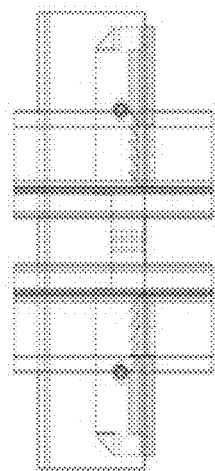
FIG. 22B
FIG. 22C
FIG. 22D
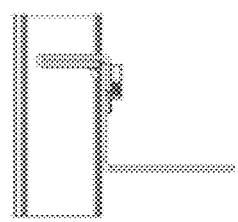
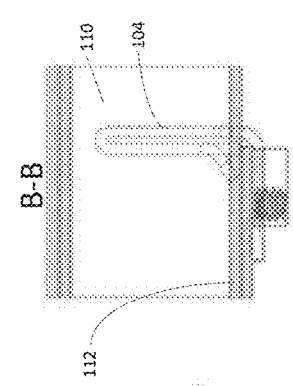
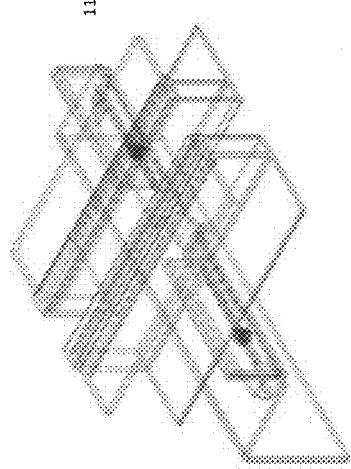
FIG. 22A
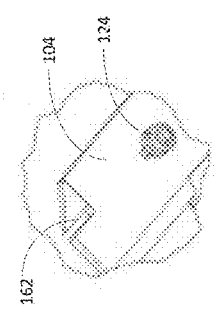
FIG. 22I
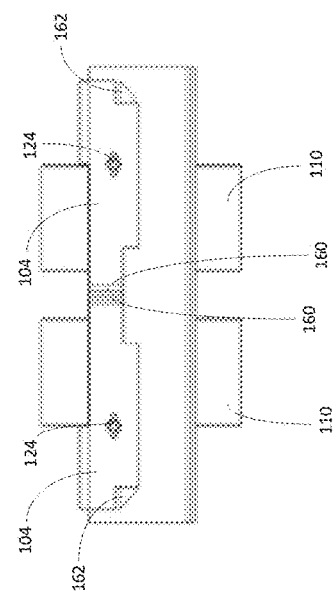
FIG. 22G
FIG. 22H
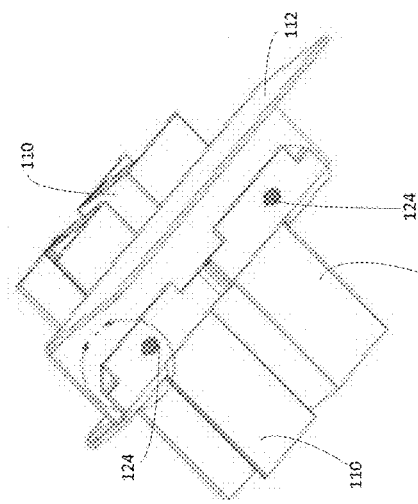
FIG. 22F
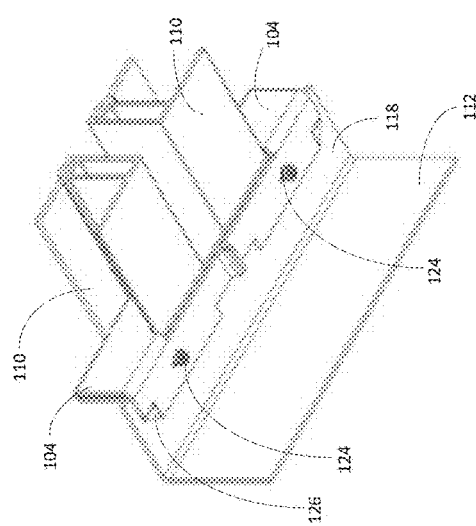
FIG. 22E

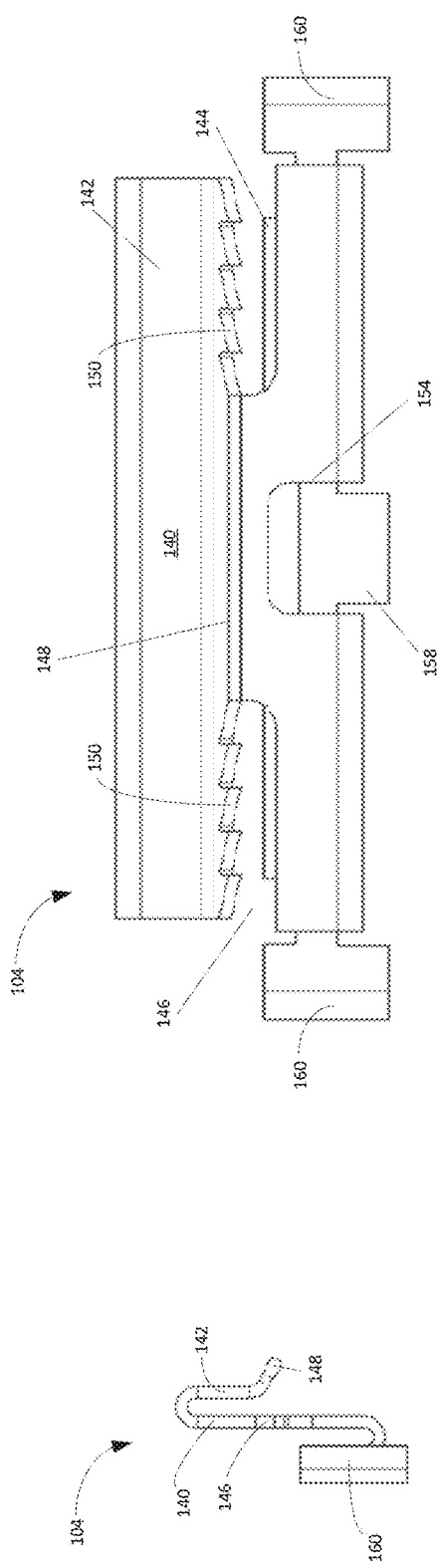
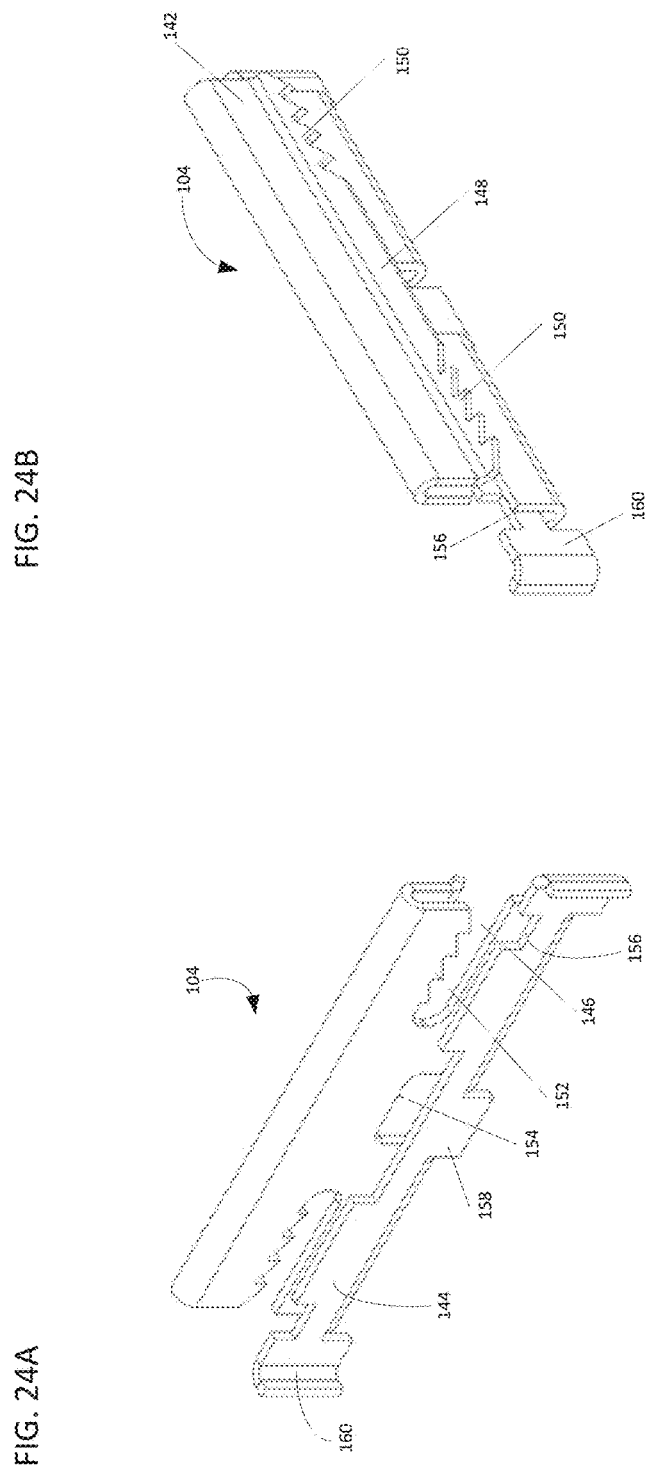
FIG. 24A
FIG. 24B
FIG. 24C
FIG. 24D

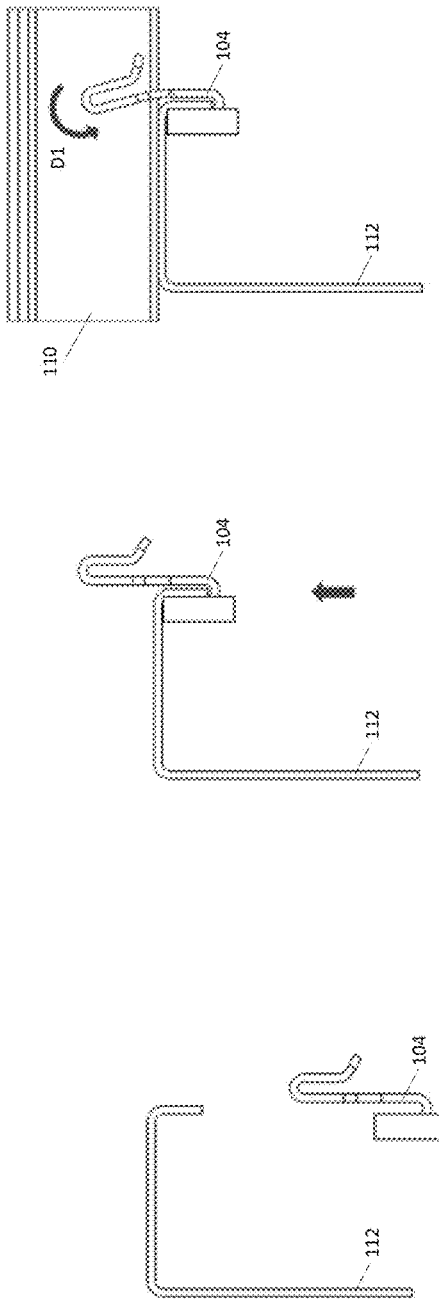
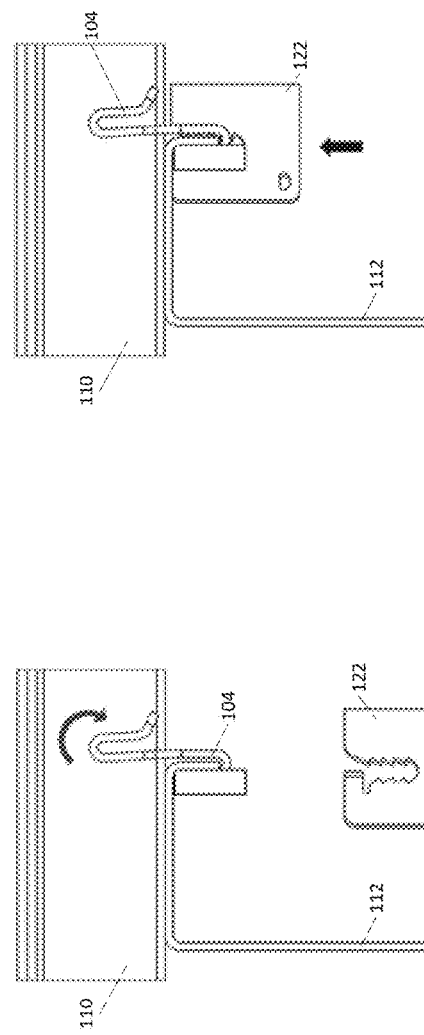

ADAPTOR FOR SPRING-BASED PV MODULE FASTENER

CROSS-REFERENCE TO RELATED APPLICATIONS

This application claims the benefit of priority under 35 U.S.C. § 119(e) of U.S. Provisional Application Ser. No. 63/055,745, filed Jul. 23, 2020, the disclosure of which is incorporated herein by reference in its entirety.

FIELD

The technology is generally related to photovoltaic fastener systems and methods. More specifically, systems and methods using spring-based fasteners are disclosed.

BACKGROUND

The most common approach to mechanically attach and electrically bond solar panels (e.g., solar photovoltaic (PV) panels) on a mounting structure is by the use of conventional fasteners involving bolts, nuts, washers or rivets. PV mounting solutions that rely on conventional bolted connections are common in all major solar markets, including residential and commercial building rooftops, solar carports and canopies, as well as utility scale ground mount applications, both in fixed tilt and trackers.

SUMMARY

In some embodiments, a clamp adapter for connecting a structure to a bracket includes a rail slot configured to receive a portion of the structure, a lower flange configured to receive and retain a portion of the bracket, and a lateral flange configured to be biased against a surface of the portion of the structure to retain the structure in the rail slot when the structure and the bracket are assembled with the clamp adapter.

In some embodiments, a method of connecting a structure to a bracket includes receiving a portion of the structure in a rail slot of a clamp adapter, and receiving and retaining a portion of the bracket in a lower flange of the clamp adapter. In some embodiments, receiving the portion of the bracket in the lower flange urges a lateral flange of the clamp adapter to bend to retain the structure in the rail slot when the structure and the bracket are assembled with the clamp adapter.

In some embodiments, a mounting system for mounting a solar panel assembly to a base assembly includes a panel support structure of the solar panel assembly, a bracket of the base assembly, and a clamp adapter configured to approximate the panel support structure and the bracket. In some embodiments, the clamp adapter can include a rail slot configured to receive a portion of the panel support structure, a lower flange configured to receive and retain a portion of the bracket, and a lateral flange configured to be biased against a surface of the portion of the bracket.

In any of the embodiments above, the rail slot and lower flange are configured such that the portion of the structure and the bracket are angled relative to one another when the structure and the bracket are assembled with the clamp adapter.

In any of the embodiments above, further including a planar body and an upper flange extending from the planar body, wherein the lower flange extends from the planar body, and wherein the lateral flange extends from the upper flange in a direction that is directed at least partially outwards from the planar body.

In any of the embodiments above, the clamp adapter is configured to engage with a fastener mechanism, wherein the fastener mechanism is configured to fix a position and orientation of the portion of the bracket relative to the lateral flange.

In any of the embodiments above, a portion of the clamp adapter is configured to elastically deform when the structure and the bracket are assembled with the clamp adapter.

In any of the embodiments above, further including a first plurality of teeth that extend into the rail slot.

In any of the embodiments above, further including a second plurality of teeth extending from the lateral flange towards the surface of the portion of the structure when the structure and the bracket are assembled with the clamp adapter.

In any of the embodiments above, the lower flange further comprises a spacer flange.

In any of the embodiments above, the lower flange is substantially parallel to the portion of the structure when the structure and the bracket are assembled with the clamp adapter.

In any of the embodiments above, the lower flange is angled with respect to the portion of the structure when the structure and the bracket are assembled with the clamp adapter.

In any of the embodiments above, further including electrically connecting the structure and the bracket through the clamp adapter.

In any of the embodiments above, further including receiving a portion of an additional structure in a rail slot of an additional clamp adapter, receiving and retaining a portion of the bracket in a spacer flange of the additional clamp adapter, and receiving and retaining a portion of the bracket in a spacer flange of the clamp adapter. In some embodiments, the clamp adapter and the additional clamp adapter are configured to connect the structure and the additional structure to the bracket.

In some embodiments, a mounting system for mounting a solar panel assembly to a base assembly includes a mounting member, a clamp adapter connected to the mounting member, a fastener mechanism to secure the clamp adapter to the mounting member, and a panel rail secured to the mounting member by the clamp adapter in a substantially orthogonal relationship.

In any of the embodiments above, the clamp adapter includes a body, an upper flange connected to the body, a lower flange connected to the body, and a panel rail slot within the body that is configured to capture a lower flange of the panel rail.

In any of the embodiments above, the mounting member includes a support surface, and a mounting lip extending from the support surface at a mounting lip angle.

In any of the embodiments above, the lower flange extends from the body at a lower flange angle that is substantially the same as the mounting lip angle.

In any of the embodiments above, the panel rail slot includes one or more rail slot teeth that increase the frictional engagement between the panel rail slot and the lower flange of the panel rail.

In any of the embodiments above, the upper flange of the clamp adapter includes a lateral flange configured to engage the lower flange of the panel rail.

In any of the embodiments above, the lateral flange of the clamp adapter includes one or more lateral flange teeth.

In any of the embodiments above, the lower flange further includes a spacer flange.

In any of the embodiments above, the fastener mechanism includes a spring clamp.

In any of the embodiments above, the spring clamp includes a pair of legs that are spring-loaded to oppose an approximation of the legs by an external compressive force, and a pair of receiver slots, wherein each of the pair of receiver slots is located on a corresponding one of the pair of legs, and wherein the pair of receiver slots collectively provide a clearance to admit the panel support bracket and the base bracket when the pair of legs are compressed together In any of the embodiments above, the spring clamp further includes a pair of locking tabs, wherein each of the pair of locking tabs is located on a corresponding one of the pair of legs.

In any of the embodiments above, each of the pair of receiver slots includes a plurality of teeth.

In any of the embodiments above, the fastener mechanism includes one or more set screws.

In any of the embodiments above, the clamp adapter includes one or more bonding barbs to place the clamp adapter to electrically bond the clamp adapter to the mounting member.

BRIEF DESCRIPTION OF DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function.

FIGS. 7A-7F present front views of various embodiments of standalone adapters and adapters connecting PV frames with corresponding mounting members.

FIGS. 8A-8E present various views of an adapter with a 90° lower flange according to some embodiments;

FIGS. 10A-10E present various views of an adapter with a 45° lower flange according to some embodiments;

FIGS. 11A-11H present various views of the adapter from FIGS. 10A-10E connecting a PV frame to a mounting member with a 45° lip according to some embodiments;

FIGS. 13A-13H present various views of the adapter from FIGS. 12A-12E connecting a PV frame to a mounting member with a horizontal lip according to some embodiments;

FIGS. 14A-14E present various views of an adapter with a 90° lower flange and spacer flange according to some embodiments;

FIGS. 15A-15H present various views of two of the adapters depicted in FIGS. 14A-14E connecting two PV frames to a mounting member with a vertical lip according to some embodiments;

FIGS. 16A-16I present various views of two of the adapters depicted in FIGS. 14A-14E connecting two PV frames to a mounting member with a vertical lip using set screws, according to some embodiments;

FIGS. 17A-17E present various views of an adapter with a 45° lower flange and spacer flange according to some embodiments;

FIGS. 18A-18H present various views of two of the adapters depicted in FIGS. 17A-17E connecting two PV frames to a mounting member with a 45° lip according to some embodiments;

FIGS. 19A-19I present various views of two of the adapters depicted in FIGS. 17A-17E connecting two PV frames to a mounting member with a 45° lip using set screws, according to some embodiments;

FIGS. 20A-20G present various views of an adapter with a 0° lower flange and spacer flange according to some embodiments;

FIGS. 21A-21H present various views of two of the adapters depicted in FIGS. 20A-20G connecting two PV frames to a mounting member with a horizontal lip according to some embodiments;

FIGS. 22A-22I present various views of two of the adapters depicted in FIGS. 20A-20G connecting two PV frames to a mounting member with a horizontal lip using set screws, according to some embodiments;

FIGS. 24A-24D present various views of another embodiment of an adapter with a spacer flange according to some embodiments;

FIGS. 25A-25F present perspective views of the adapter from FIGS. 24A-24D in the process of connecting a PV frame to a mounting member;

FIGS. 26A-26E present side views of the adapter from FIGS. 24A-24D in the process of connecting a PV frame to a mounting member;

DETAILED DESCRIPTION

Figure 1:
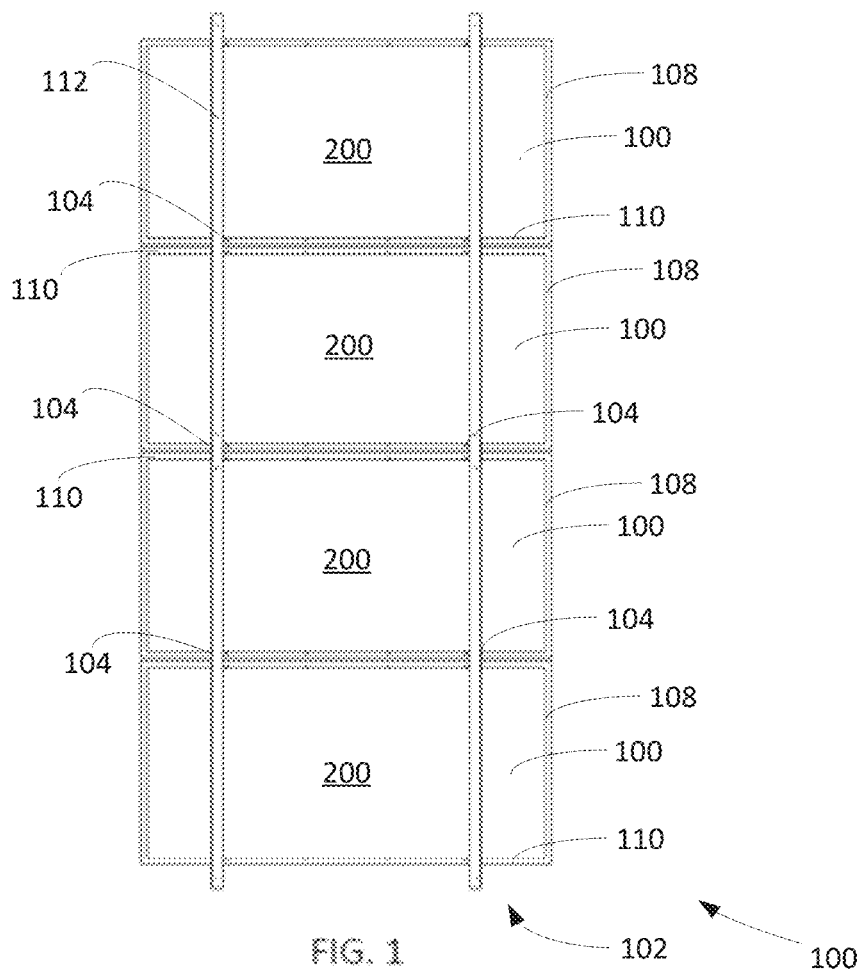
FIG. 1 presents a bottom view of a series of photovoltaic panels attached in a landscape orientation to a pair of mounting members according to some embodiments.

Fasteners such as bolted connections are conventionally used to assembly PV assemblies to a mounting structure in a variety of solar markets. The Inventors have recognized that the use of conventional fasteners pose several problems. First, panel dimensions and the position of mounting holes in panel frames are not typically standardized across manufacturers. This lack of standardization requires vendors to customize mounting hardware for each solar project to match the specifications of different panels, which can extend manufacturing lead times and increase supply chain costs. Second, the use of bolted connections can increase the complexity and time required for panel installation, along with the risk of installer error. For example, mounting holes at the bottom of PV panel frames may need to be manually aligned with mating holes in the supporting structure (e.g. mounting rails), then bolts may need to be threaded, washers inserted, and nuts temporarily placed. These steps are taken four times for each PV panel, typically in conditions that are not ergonomic or comfortable for the installers. In each instance, these parts and tools may be missing, lost, stolen, or fall over the panels, potentially causing damage to the solar cells. Finally, nuts and bolts must be tightened at specific torque values, which in practice is very difficult to achieve. Over-torqueing is a common cause for the failure of bolts under high wind loads, whereas under-torqueing may lead to loose bolts and nuts, due to vibrations and other environmental conditions. This adds maintenance costs by requiring constant checking and re-tightening of large numbers of bolts and nuts on site.

Currently, only a few fasteners provide mechanical attachment of PV panels with integrated bonding without relying on bolted connections and specialized tools. Further, the Inventors have recognized that the existing commercial solutions tend to be complicated to install, by requiring installation without complete visibility, or pre-attachment of fastener into the frame of PV panels, thus frustrating efforts to provide an easily repeatable installation.

In view of the above, the Inventors have recognized the benefits associated with a fastener adapter system for solar panel installation, where a bolt-less fastener and associated adapter may be used to rapidly and easily attach a structure, such as a solar panel, on a support member in a landscape, or other desired, orientation.

In some embodiments, a clamp adapter (also referred to herein as a "fastener adapter") may be used as an intermediary connector that is configured to fasten together separate structures which may be angled with respect to one another (e.g., not parallel relative to one another) in combination with another connector. In some embodiments, the clamp adapter may at least partially retain a structure and a bracket within the clamp adapter. The above noted separate connector may then affix one of the bracket and the structure to the clamp to maintain a position and orientation of the structure or connector relative to the clamp adapter. The clamp adapter may also be configured to clamp together at least a portion of the structure and the bracket to maintain a desired relative orientation and position of the structure and the bracket.

In some embodiments, a fastener adapter may include a lower flange to receive a portion of a bracket or other structure (e.g., a mounting lip of a mounting member), a rail slot to accommodate a second structure such as a portion of a solar panel structure (e.g., a flange of a panel rail), and a lateral flange to compress the two structures disposed against one another with at least one of the structures in contact with the lower flange. In some embodiments, a fastener adapter may include one or more sets of teeth configured to improve the grip between the fastener adapter and the structure on which it may be installed (e.g., a panel rail). In some embodiments, the one or more sets of teeth may dig into the target surface, improving mechanical, and in some embodiments, electrical contact between the various components. In some embodiments, the one or more sets of teeth may limit movement of the fastener adapter in one or more directions relative to the structures on which it may be installed. In some embodiments, the fastener adapter may be elastically deformed in one or more portions to accommodate a broad range of structure sizes and/or orientations. As will be described in greater detail below, the elasticity (and associated elastic recovery) of the fastener adapter may increase the flexibility and utility of the currently disclosed connection systems and methods.

Before describing various embodiments of the present disclosure in more detail by way of exemplary description, examples, and results, it is to be understood as noted above that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications referenced in any portion of this application are herein expressly incorporated by reference in their entirety to the same extent as if each individual patent or publication was specifically and individually indicated to be incorporated by reference.

As utilized in accordance with the methods and apparatus of the present disclosure, the following terms, unless otherwise indicated, shall be understood to have the following meanings:

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The term "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used herein, all numerical values or ranges (e.g., in units of length such as micrometers or millimeters) include fractions of the values and integers within such ranges and fractions of the integers within such ranges unless the context clearly indicates otherwise. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, of 1-10, 10-20, 20-30, 30-40, 40-50, 50-60, 60-75, 75-100, 100-150, 150-200, 200-250, 250-300, 300-400, 400-500, 500-750, 750-1,000, includes ranges of 1-20, 10-50, 50-100, 100-500, and 500-1,000, for example.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error. Further, in this detailed description, each numerical value (e.g., temperature or time) should be read once as modified by the term "about" (unless already expressly so modified), and then read again as not so modified unless otherwise indicated in context. As noted above, any range listed or described herein is intended to include, implicitly or explicitly, any number within the range, particularly all integers, including the end points, and is to be considered as having been so stated. For example, "a range from 1 to 10" is to be read as indicating each possible number, particularly integers, along the continuum between about 1 and about 10. Thus, even if specific data points within the range, or even no data points within the range, are explicitly identified or specifically referred to, it is to be understood that any data points within the range are to be considered to have been specified, and that the inventors possessed knowledge of the entire range and the points within the range. Unless otherwise stated, the term "about" or "approximately", where used herein when referring to a measurable value such as an amount, length, thickness, a temporal duration, and the like, is meant to encompass, for example, variations of ±20% or ±10%, or ±5%, or ±1%, or ±0.1% from the specified value, as such variations are appropriate to perform the disclosed methods and as understood by persons having ordinary skill in the art.

As used herein, the term "substantially" means that the subsequently described parameter, event, or circumstance completely occurs or that the subsequently described parameter, event, or circumstance occurs to a great extent or degree. For example, the term "substantially" means that the subsequently described parameter, event, or circumstance occurs at least 90% of the time, or at least 91%, or at least 92%, or at least 93%, or at least 94%, or at least 95%, or at least 96%, or at least 97%, or at least 98%, or at least 99%, of the time, or means that the dimension or measurement is within at least 90%, or at least 91%, or at least 92%, or at least 93%, or at least 94%, or at least 95%, or at least 96%, or at least 97%, or at least 98%, or at least 99%, of the referenced dimension or measurement (e.g., length).

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Where applicable, although state diagrams, flow diagrams or both may be used to describe embodiments, the present disclosure is not limited to those diagrams or to the corresponding descriptions. For example, flow need not move through each illustrated box or state, or in exactly the same order as illustrated and described. Methods of the present disclosure may be implemented by performing or completing manually, automatically, or a combination thereof, selected steps or tasks. The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

It should be noted that where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility). Still further, additional aspects of the various embodiments of the instant disclosure may be found in one or more appendices attached hereto and/or filed herewith, the disclosures of which are incorporated herein by reference as if fully set out at this point.

Turning now to the figures, several nonlimiting embodiments are described in further detail. However, it should be understood that the disclosure is not limited to only these specific embodiments and that appropriate combinations and modifications of the components and methods disclosed in relation to the figures are also envisioned as the disclosure is not limited in this fashion.

Beginning with the embodiment depicted in FIG. 1, shown therein is a bottom view of a plurality of solar panel assemblies 100 affixed to a base assembly 102 with a plurality of clamp adapters 104. Each solar panel assembly 100 includes a photovoltaic (PV) panel 200 attached to a panel frame 108. The panel frame 108 includes one or more panel rails (also referred to herein as panel support structures, or structures) 110 that extend along at least one side of the PV panel 200. In the embodiment depicted in FIG. 1, the panel frame 108 includes a pair of panel rails 110 that extend along the length of the PV panel 200. As depicted in FIG. 1, the PV panels 200 are mounted to the base assembly 102 in a "landscape" configuration in which the panel rails 110 are mounted in an orthogonal relationship to the mounting members (also referred to as brackets herein) 112 of the base assembly 102 where a portion of a panel rail attached to an associated mounting member may extend in a direction that is orthogonal to a direction in which the associated portion of the mounting member extends. However, other non-parallel arrangements of the rails and associated mounting member are also contemplated. In the depicted embodiment, each panel rail 110 includes an upper flange 114 for supporting the PV panel 200 and a lower flange 116 for connection to the mounting member 112.

The base assembly 102 can be supported by, or attached to, a fixed structure (such as a roof, canopy or ground mounted structure) or to an articulating carrier that adjusts the angular position of the solar panel assembly 100 to optimize the collection of light. For example, the base assembly 102 can be connected to a single axis tracker (SAT) that automatically or programmatically orients the solar panel assembly 100 with respect to a light source. The mounting members 112 can be beams, purlins or other load bearing members. The mounting members may have a C-shaped, Z-shaped, L-shaped or other cross-sectional configuration. Each mounting member may include a support surface 118 and a mounting lip 120 that extends at least partially, and in some instances, completely along a length of the support surface. The mounting lip may extend out from and be disposed at an angle from 0° (coplanar) to 90° (right angle) relative to the support surface 118. Three non-limiting variations of the mounting members 112 are depicted in FIGS. 7A-7F as elaborated on in further detail below. In some embodiments, mounting members 112 may be manufactured from an electrically conductive metal.

Figure 2:
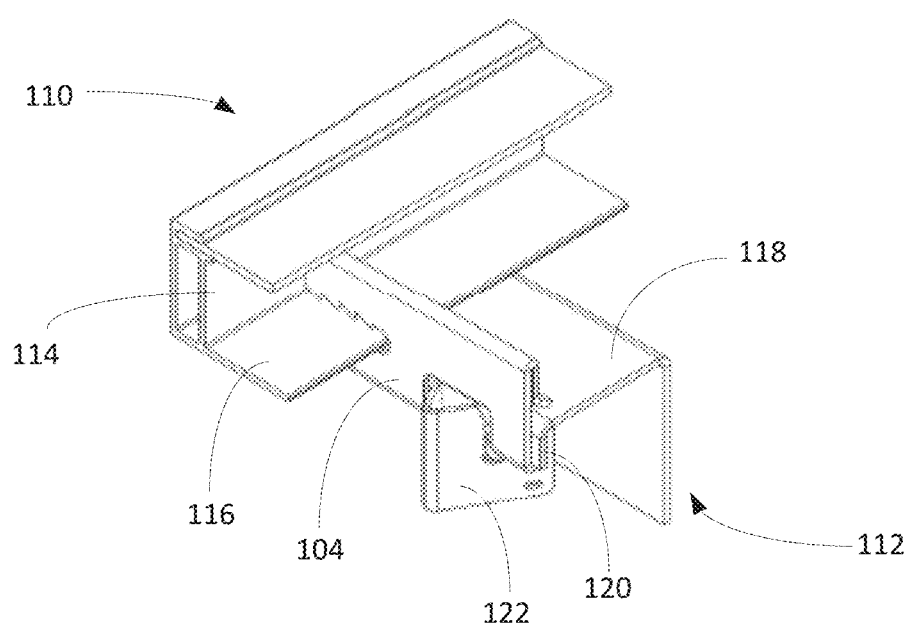
FIG. 2 presents a perspective view of a PV frame connected to a mounting member with an adapter and spring clamp according to some embodiments.

As depicted in FIG. 2, the panel rail 110 is connected to the mounting member 112 with the clamp adapter 104. The clamp adapter 104 is secured to the mounting member 112 with a fastener mechanism. In some embodiments, the fastener mechanism is a spring clamp 122. The spring clamp 122 secures the adapter 104 into a fixed position on the support surface 118 and mounting lip 120 of the mounting member 112. In other embodiments, the fastener mechanism includes one or more set screws 124 that are configured to be inserted into set screw holes 126. Once the adapter 104 is secured to the mounting member 112, the panel rail 110 can be inserted into the adapter 104. In some embodiments, the fastener mechanism includes both spring clamps 122 and set screws 124. Additionally, other embodiments in which other types of connections are used for attaching the clamp adapter is connected to the support surface and/or lip of the mounting member are also contemplated as the disclosure is not limited in this fashion.

It should be appreciated that in some embodiments the clamp adapters described herein may be installed on a base assembly without significant modification (e.g., drilling, bending, etc.) of the beams and associated components. In some embodiments, the clamp adapters described herein may be installed on a base assembly without any modification of the beams and associated components. Accordingly, the clamp adapters described herein may be used with conventional base assembly components and retrofitted into existing PV systems without excessive modification costs.

In some embodiments, the clamp adapters described herein may be formed from a stamped spring-grade steel sheet metal with anti-corrosion properties (e.g., stainless or galvanized). However, the clamp adapters may be constructed of any suitable material or combination of materials including, but not limited to, metals such as steel, stainless steel, aluminum, and titanium, and metal alloys, ceramic composites, composite reinforced metals, plastics, combinations of the foregoing, and/or any other appropriate material exhibiting an appropriate combination of elasticity and strength. In some embodiments, the clamp adapters may be constructed from a conductive metal and/or composite material to provide an electrical connection, such as a grounding path, between the panel rail, the spring clamp, and the mounting member. It should be appreciated that the clamp adapters may be formed of any suitable material which may be sufficiently strong to maintain robust mechanical connections between the various components of the PV assembly and sufficiently elastic. As will be described in greater detail below, the clamp adapters may be elastically deformed to accommodate a large variation in mounting member size and/or angles.

Turning to FIGS. 3-6, shown therein are front perspective, rear perspective, rear and front views of a spring clamp 122. The construction and use of the spring clamp in connection with the mounting of solar panels in a "portrait" orientation is disclosed in WO 2020/076870 A1, the disclosure of which is fully incorporated by reference as if fully set forth herein. In exemplary embodiments, the spring clamp 122 is made from a stamped spring-grade steel sheet metal with anti-corrosion properties (e.g., stainless or galvanized). The spring clamp 122 may be constructed of materials including, but not limited to, metals such as steel, stainless steel, aluminum, and titanium, and metal alloys, ceramic composites, composite reinforced metals, plastics, combinations of the forgoing, and/or any other appropriate material exhibiting an appropriate combination of elasticity and strength. In some embodiments, the spring clamp 122 may be constructed from a conductive material, such as a conductive metal, to provide a grounding path between the panel rail 110 and the mounting member 112.

Figure 6:
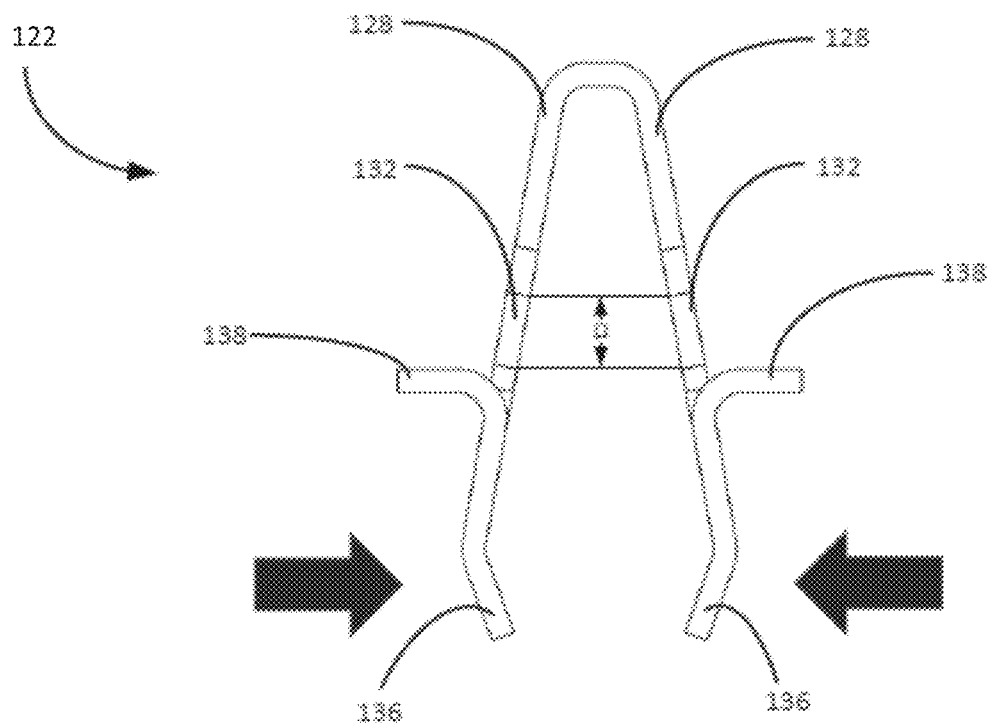
FIG. 6 is a rear view of the spring clamp of FIG. 3 in a compressed state.
Figure 9A:
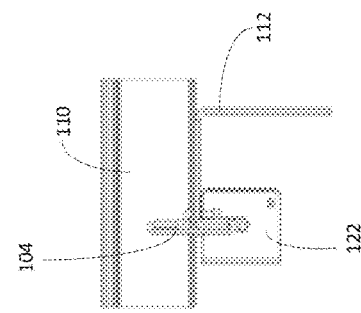
FIGS. 9A-9H present various views of the adapter from FIGS. 8A-8E connecting a PV frame to a mounting member with a vertical lip according to some embodiments.
Figure 9B:
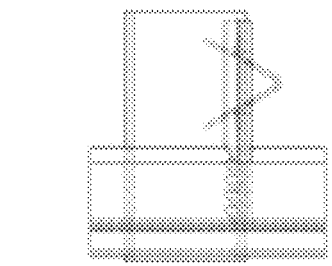
Figure 9C:
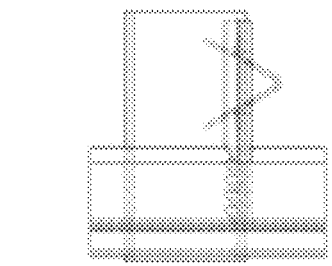
Figure 9D:
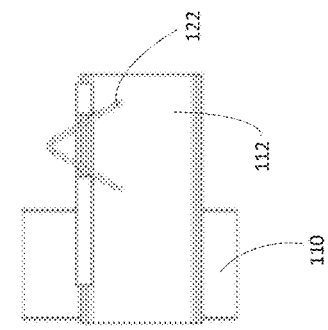
Figure 9E:
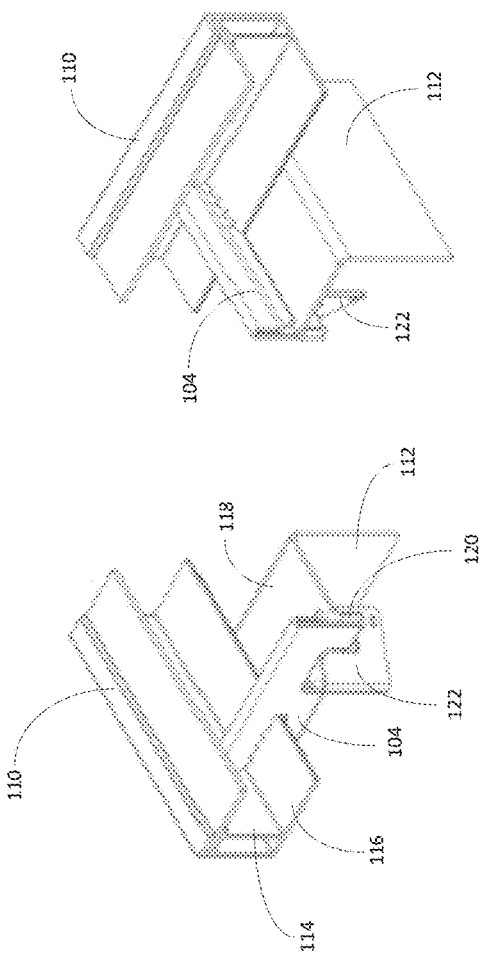
Figure 9F:
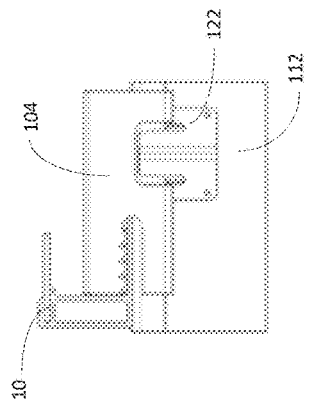
Figure 9G:
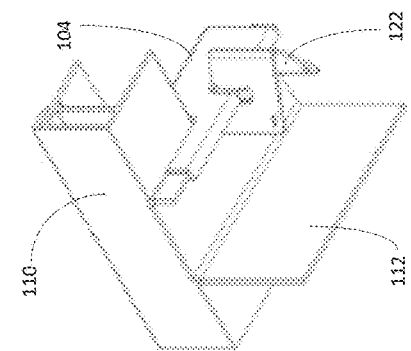
Figure 9H:
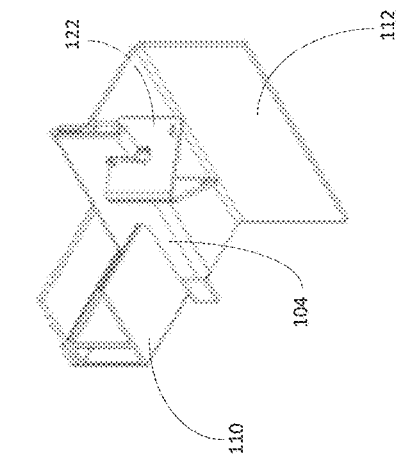
Figures 12A, 12B, 12C, 12D, 12E:
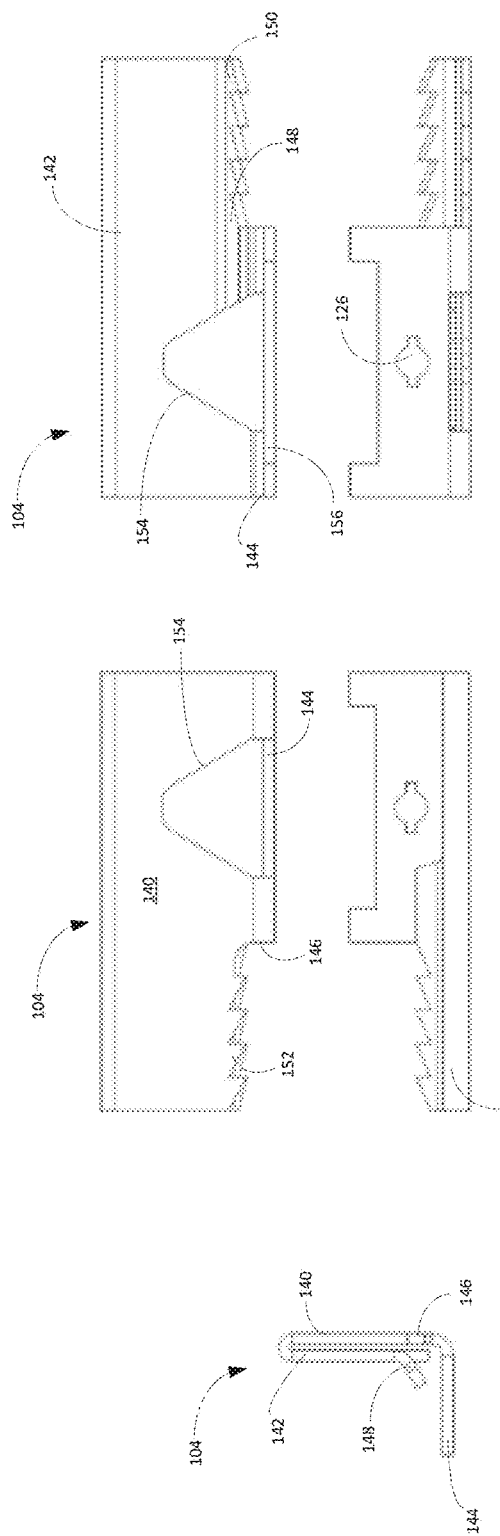
FIGS. 12A-12E present various views of an adapter with a 0° lower flange according to some embodiments.

The spring clamp 122 includes a clamp body that is substantially "V-shaped," with two or more legs 128 extending away in an oblique angle from a common apex 130. The thickness of the clamp body and the material of construction permit the legs 128 to be approximated or compressed toward one another, as illustrated in FIG. 6. When the compressive force is removed, the spring energy stored within the spring clamp 122 forces the legs 128 to separate into a relaxed state. In some embodiments, the angle between the two legs 128 is between about 55° and about 75° when the spring clamp 122 is in a relaxed state. In some embodiments, the legs 128 form an angle from the apex 130 of about 60° when the spring clamp 122 is in a relaxed state.

Figure 3:
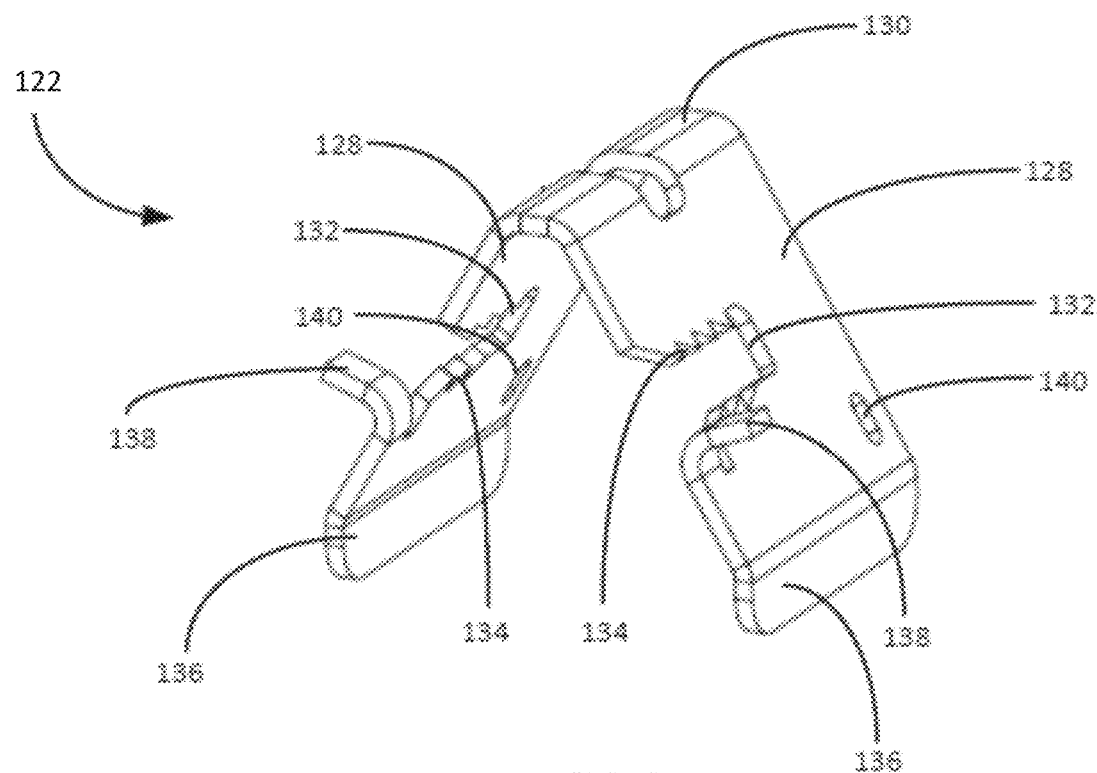
FIG. 3 is a front perspective view of a spring clamp according to some embodiments.
Figure 4:
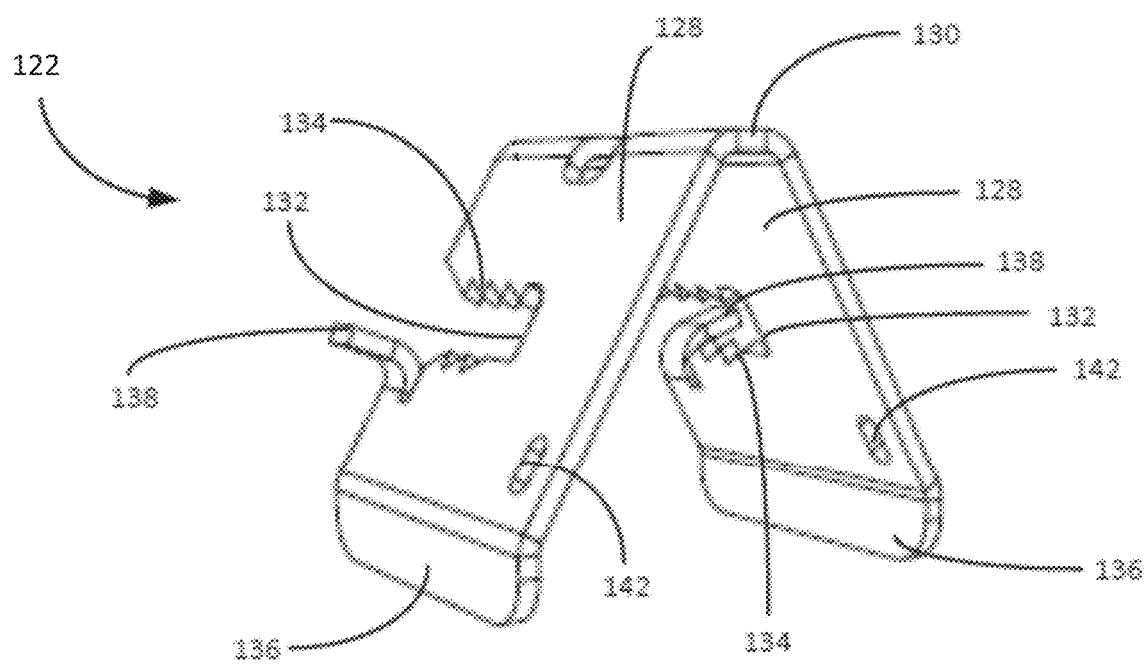
FIG. 4 is a rear perspective view of the spring clamp of FIG. 3.

Each leg 128 has a receiver slot 132 that extends from the front of the leg 128 to an interior portion of the leg 128. As best illustrated in FIG. 3, the receiver slots 132 are arranged in a substantially normal, or orthogonal, relationship with respect to the legs 128 such that the receiver slots 132 are angled downward in an oblique manner when the spring clamp 122 is in a relaxed state. Due to the angular disposition of the legs 128 and the orientation of the receiver slots 132 within the legs 128, the receiver slots 132 together provide a first clearance ($C_1$) that represents the height of the linear gap that extends through the two receiver slots 132. When the legs 128 of the spring clamp 122 are approximated under an external compressive force (as illustrated in FIG. 6), the angular disposition of the legs 128 and the receiver slots 132 is reduced to provide a second clearance ($C_2$) that is less than the first clearance ($C_1$).

In some embodiments, each of the receiver slots 132 includes a plurality of teeth 134. The serrated edges of the receiver slots 132 are configured to scratch the surface of the adapter 104 and the mounting member 112 to increase the frictional resistance between the spring clamp 122, the adapter 104 and the mounting member 112. The teeth 134 also increase the electrical conductivity between the spring clamp 122, the adapter 104 and the mounting member 112 by removing any non-conductive coatings applied to these components.

Figure 5:
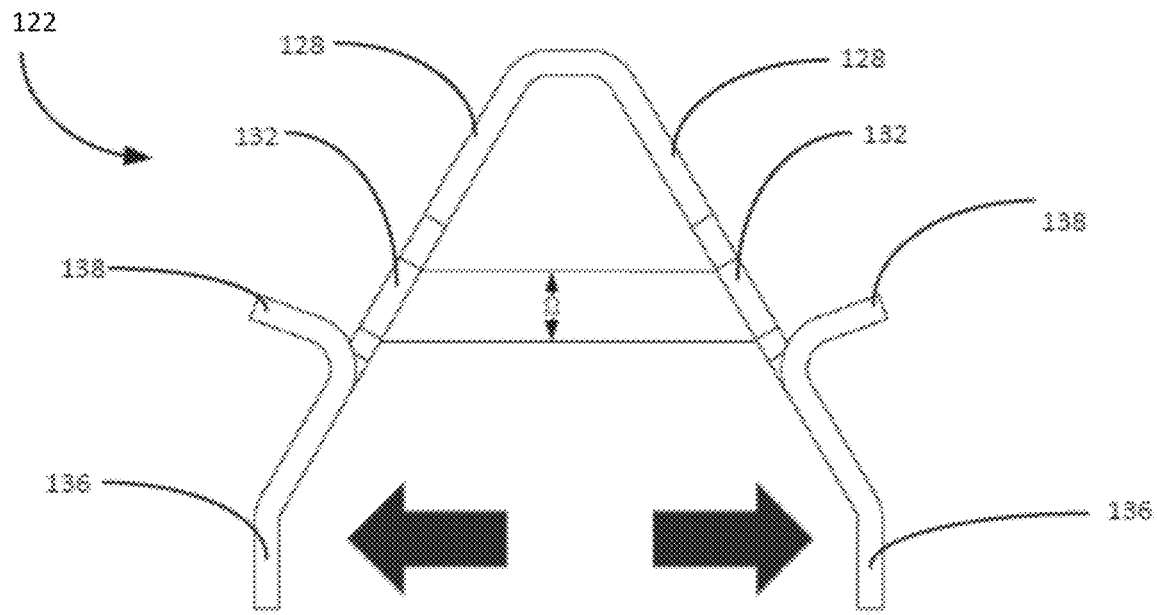
FIG. 5 is a rear view of the spring clamp of FIG. 3 in deployed state.

Each leg 128 of the spring clamp 122 terminates in a foot 136. The foot 136 can be coplanar with the leg 128 or angularly offset from the leg 128 such that the foot 136 extends in a substantially vertical direction when the spring clamp 122 is in a relaxed state. The foot 136 can extend from the leg 128 at an angle ranging from about 0° to about 45° (an angular offset of about 30° is depicted in FIGS. 5-6). The foot 136 facilitates the use of pliers or other tools for compressing the legs 128 of the spring clamp 122. In some embodiments, each foot 136 includes a slot or hole (not depicted) that is configured to receive a corresponding post or tab on a custom-made tool to facilitate the engagement of the compression tool with the foot 136 of each leg 128.

Turning to FIGS. 8A-8E, shown therein are various depictions of a clamp adapter 104 according to some embodiments. The clamp adapter 104 includes a substantially planar body 140 extending along a first axis AX1, an upper flange 142 extending from an upper portion of the body 140, a lower flange 144 extending from a lower portion of the body 140, and a panel rail slot 146 extending into the body 140 from the front side of the body 140. The upper flange 142 can be formed by making a U-shaped bend to the body 140 such that the upper flange 142 extends downward in a substantially parallel relationship with the body 140 along axis AX1. In some embodiments, the upper flange 142 may be angled with respect to the body 140 and axis AX1. Similarly, the lower flange 144 can be formed by making a bend along the lower portion of the body 140 such that the lower flange 144 extends upward in a substantially parallel relationship with the body 140. As will be described in further detail below, the lower flange 144 may be angled with respect to body 140 and AX1 to accommodate a variety of different mounting member lip orientations.

In some embodiments, the planar body 140 may extend along a second axis AX2 (as shown in FIG. 8B). In some embodiments, the upper flange 142 may include a lateral flange 148 extending out of plane of the upper flange 142. The lateral flange 148 may be angled with respect to the axis AX1. As shown in FIGS. 8B-8E, the upper flange 148 may extend along at least a portion of the planar body 140 along axis AX2 (e.g., the entire length of the planar body 140). In some embodiments, the lateral flange 148 may be angled with respect to the upper flange 142 in order to apply a compressive stress to a structure which may be captured within the clamp adapter 104. In some embodiments, a portion of the structure may be compressed between the lateral flange 148 and the lower flange 144.

In some embodiments, the lateral flange 148 may include one or more lateral flange teeth 150 extending along a portion of the lateral flange 148. The lateral flange teeth 150 may be configured to engage with a support structure (e.g., a panel rail). In some embodiments, the lateral flange teeth 150 may scratch a surface of the panel rail to remove any non-conductive coatings to electrically connect the clamp adapter 104 and panel rail. In some embodiments, the lateral flange teeth 150 may improve the frictional engagement of the clamp adapter 104 and the panel rail. It should be appreciated that while in some embodiments, the lateral flange teeth 150 may extend along the same direction as the lateral flange 148 (e.g., the same direction out of plane of the body 140), in some embodiments, the lateral flange teeth 150 may be extend at an angle with respect to the lateral flange 148. In some embodiments, as shown in FIGS. 8B and 8C, the lateral flange teeth 150 may be pointed towards the lateral flange 148, such that a lateral force (e.g., pulling the clamp adapter 104 away from a rail panel along axis AX2) may further engage the lateral flange teeth 150 on the rail panel. In other words, the lateral flange teeth 150 may be directional, similar to a ratchet mechanism. Accordingly, the lateral flange teeth 150 may limit the lateral movement of the clamp adapter 104 after assembly on a rail panel.

In some embodiments, a clamp adapter may receive a panel rail within a rail slot 146 formed in the body 140. The rail slot 146 may extend along a portion of the body 140 along axis AX2, as shown in FIG. 8B. It should be appreciated that the length of the rail slot 146 may be any suitable proportion of the body 140 to accommodate a rail panel, including, but not limited to, one fifth, one fourth, one third, one half, two thirds, or any other proportion of the body 140. Accordingly, lateral flange teeth 150 may extend at least partially along the length of the rail slot 146 in order to engage with (e.g., scratch) the panel rail. In some embodiments, an opening formed between the lateral flange 148 and the lower flange 144 may mirror the rail slot 146 on an opposing surface of the body 140, as shown in FIGS. 8A-8E. In this way, a panel rail may be inserted along axis AX2 into a channel formed by the rail slot 146 on one side, and lateral flange 148 and lower flange 144 on the opposing side. As will be described in greater detail below, in some embodiments, the rail slot 146 may be wider along axis AX1 than the opening between the lateral flange 148 and lower flange 144.

In some embodiments, the rail slot 146 may include one or more rail slot teeth 152 configured to engage with a panel rail, as shown in FIG. 8D. The rail slot teeth 152 may be pointed similarly to the lateral flange teeth 150 to limit lateral movement of the clamp adapter 104 with respect to the panel rail after assembly. In some embodiments, as shown in FIG. 8D, the rail slot teeth 152 may be located along the plane of the body 140, as opposed to the lateral flange teeth 150, which may extend at an angle with respect to the plane of the body 140. It should be appreciated embodiments in which rail slot teeth 152 extend at an angle with respect to the plane of the body 140 are also contemplated. In some embodiments, the rail slot teeth 152 may scratch a surface of the panel rail to remove any non-conductive coatings to electrically connect the clamp adapter 104 and panel rail. In some embodiments, the rail slot teeth 152 may improve the frictional engagement of the clamp adapter 104 and the panel rail. In some embodiments, the rail slot teeth 152 may extend a similar length along axis AX2 to the lateral flange teeth 150, whereas in other embodiments, the rail slot teeth 152 may extend along a shorter or longer length along axis AX2 with respect to the lateral flange teeth 150. It should be appreciated that the current disclosure is not limited by the length or number of teeth of each of the lateral flange teeth 150 or the rail slot teeth 152.

In view of the above, it should be appreciated that the clamp adapter 104 of the present disclosure may accommodate broad ranges of mounting member 112 thicknesses and lip 120 angles, resulting in greater tolerance of the system. In some embodiments, the tolerance management of the clamp adapter 104 may be a result of the spring-like behavior of the clamp body 140. As shown in FIGS. 8A-8E, the locations of the panel rail slot 146 may allow the clamp body 140 to rotate with respect to the lower flange 144 when the panels are subjected to a time varying load as might occur during winding conditions. Accordingly, the clamp body 140 may act as a leaf spring to accommodate a range of various mounting member 112 thicknesses and lip 120 angles, as will be described in greater detail below.

In some embodiments, as depicted in FIGS. 8B and 8C, rail slot teeth 152 may extend further towards the lower flange 144 along axis AX1 than lateral flange teeth 150. Accordingly, as the clamp body 140 may be elastically bent about the rail slot 146 to accommodate various mounting member 112 thicknesses and lip 120 angles, rail slot teeth 152 may better engage with the lower flange 116 of the panel rail 110. In some embodiments, engagement of the lower flange 116 with the rail slot teeth 152 may control the extent of the elastic bending of the clamp body 140, thereby reducing the likelihood of undesirable further bending of the clamp adapter 104.

In some embodiments, the combination of the leaf-spring behavior of the clamp body 140 and variation in tooth length of the rail slot teeth 152 and lateral flange teeth 150 may enhance the shock-absorbance behavior of the clamp adapter 104. The elasticity of the clamp body 140 in combination with the engagement of the mounting member 112 and teeth 150, 152 may reduce stresses induced by a variety of environmental factors (e.g., strong wind, heavy rainfall, etc.) or other stressors which may induce vibrations or stresses within the system. For example, an external force could be applied along axis AX1 (see FIG. 8B) to a mounting member. The clamp body 140 may be able to bend about the rail slot 146 to accommodate this stress, instead of transferring said stress to the mounting member. Once the external force is removed, the clamp body 140 may elastically relax back into its original clamped orientation (which may still be partially tensioned to accommodate the panel rail). In this way, the clamp adapter 104 may absorb a significant portion of the shock loading of the system, reducing stresses transferred to the more rigid mounting member and/or panel rail. The elasticity of the clamp adapter 104, and ability to recover from deformations caused by external stressors, may therefore reduce the overall wear of the system and yield a longer lifetime of the PV assembly.

The body 140 also includes a clamp cutout 154 that is sized to admit the spring clamp 122 or another clamping mechanism. The lower flange 144 optionally includes a locking notch 156 and an indexing tab 158. The locking notch 156 and indexing tab 158 are configured to control the engagement of the spring clamp 122 on the clamp adapter 104.

It should be appreciated that the size of the clamp adapter 104 (along axis AX1 and axis AX2, as shown in FIG. 8B) may be chosen to balance the elasticity (e.g., spring-like bending about the rail slot 146) as well as the mechanical rigidity (e.g., to robustly couple a panel rail and a mounting member). Accordingly, the clamp adapter 104 may have any suitable length along either axis AX1 or axis AX2, as the present disclosure is not so limited.

Importantly, the angular orientation of the lower flange 144 with respect to the plane of the body 140 is configured to match the angular orientation of the mounting lip 120 of the mounting member 112. Thus, in the embodiments depicted in FIGS. 8A-9H, the lower flange 144 extends upward in a substantially vertical direction that matches the vertical mounting lip 120 of the mounting member 112. In a first method of assembly, the clamp adapter 104 is placed onto the mounting member 112 such that the mounting lip 120 is captured between the body 140 and the lower flange 144. In some embodiments, the lower flange 144 may be configured to receive and retain the mounting lip 120, which may be a portion of the mounting member 112. The compressed spring clamp 122 can then be inserted onto the clamp adapter 104 such that the mounting lip 120 and lower flange 144 are captured within the receiver slots 132 of the spring clamp 122. The indexing tab 158 can be used to guide the placement of the spring clamp 122 onto the clamp adapter 104. When the spring clamp 122 is relaxed, the legs 128 separate and are captured within the locking notch 156 of the lower flange 144. In this position, the spring clamp 122 captures and compresses together the mounting lip 120 and the lower flange 144. The teeth 134 of the spring clamp 122 improve the frictional engagement between the spring clamp 122, the mounting lip 120 and the lower flange 144. The mounting member 112 and clamp adapter 104 are electrically connected through direct contact and indirect contact through the spring clamp 122.

In some embodiments, the first clearance ($C_1$) of the receiver slots 132 is greater than the combined thickness of the lower flange 144 and mounting lip 120 (or support surface 118 if no mounting lip 120 is present), while the second clearance ($C_2$) is less than the combined thickness (height) of the lower flange 144 and mounting lip 120. In these embodiments, the spring clamp 122 cannot be introduced onto the clamp adapter 104 and mounting member 112 until the combined clearance from the receiver slots 132 is increased by compressing the legs 128 together. When the compressive force is removed from the legs 128, the legs 128 are urged to separate by the spring force of the spring clamp 122 and the clearance provided by the receiver slots 132 decreases. Because the combined thickness of the lower flange 144 and mounting lip 120 is greater than the clearance provided by the receiver slots 132 when the spring clamp 122 is in a relaxed state, the introduction of the lower flange 144 and mounting lip 120 within the receiver slots 132 prevents the spring clamp 122 from returning to an entirely relaxed state. In this way, the spring force of the spring clamp 122 continually exerts an outward force on the legs 128, which is transferred through the receiver slots 132 as a compressive force that holds the lower flange 144 and mounting lip 120 together.

Once the clamp adapter 104 has been secured to the mounting member 112, the panel rail 110 can be secured to the adapter 104. The lower flange 116 of the panel rail 110 can be inserted into the panel rail slot 146. The panel rail slot 146 optimally has a clearance that is nominally the same or only slightly larger than the thickness of the lower flange 116 of the panel rail 110. This ensures an interference fit between the panel rail 110 and the clamp adapter 104. The lateral flange 148 of the clamp adapter 104 is configured to apply a compressive force to the lower flange 116 of the panel rail 110. In some embodiments, the lateral flange 148 may also be biased against the support surface 118 of the mounting member 112 in order to and apply a compressive force, when the panel rail 110 is captured within the panel rail slot 146. The lateral flange teeth 150 increase the frictional contact between the panel rail 110 and the clamp adapter 104 and improve the electrical conductivity between the panel rail 110 and the clamp adapter 104. Thus, the clamp adapter 104 and spring clamp 122 together provide an efficient, inexpensive mechanism for connecting a panel rail 110 to a mounting member 112 in an orthogonal manner without the need for additional features or modifications to the mounting rail.

In another method of assembly, the clamp adapter 104 is first connected to the panel rail 110 by placing the clamp adapter 104 onto the panel rail 110 such that the lower flange 116 of the panel rail 110 is captured within the panel rail slot 146. Once the clamp adapter 104 is attached to the panel rail 110, it can be secured to the mounting member 112 by placing the mounting lip 120 into the lower flange 144 and then locking the clamp adapter 104 onto the mounting member 112 with the spring clamp 122 or set screw 124.

Referring back to FIGS. 7A-7F, shown therein are various views of embodiments the clamp adapter 104 connected to corresponding variations of the mounting members 112. In some embodiments, a mounting member 112 may include a mounting lip 120 extending at an angle from the plane of its support surface (see, for example, FIGS. 7B and 7D). Accordingly, the clamp adapter 104 may accommodate any suitable orientation of the mounting member and associated mounting lip.

For example, an "L-Adapter 90" embodiment is shown in FIGS. 8A-9H. In some embodiments, as shown in FIGS. 8A-8E, a lower flange 144 of the "L-Adapter 90" 104 may be substantially parallel to the plane of the adapter body 140. In other words, the lower flange 144 and the adapter body 140 may together form a U-shaped opening to accommodate a mounting lip 120 extending normal to a plane of a support surface 118, as shown in FIG. 9A. Accordingly, the mounting lip 120 may be captured in the clamp adapter 104 in between the lower flange 144 and a portion of the clamp body 140. A spring clamp 122 may then be installed normal to the plane of the support surface 118 to clamp or fix the mounting member 112 and a portion of the clamp adapter 104 (e.g., indexing tab 158), as shown in FIG. 9D.

In another example, an "L-Adapter 45" embodiment is depicted in FIGS. 10A-11H. As shown in the various depictions in FIGS. 10A-11H, a clamp adapter 104 may be configured to connect a panel rail 110 to a mounting member 112 that includes a mounting lip 120 extending downward at approximately 45° relative to the plane of a support surface 118, as shown in FIG. 7D. The lower flange 144 may accordingly extend upward from the body 140 at a matching 45°. As depicted in the drawings in FIGS. 11A-11H, the spring clamp 122 may also be oriented at about 45° as it engages the mounting lip 120 and lower flange 144. It will be noted that this embodiment of the adapter 104 may not include the indexing tab 158 and the clamp cutout 154 within the adapter body 140 may be configured to accept the pitched or angled orientation of the spring clamp 122 (see FIG. 10B).

Turning to FIGS. 12A-13H, shown therein are various depictions of an "L-Adapter 00" embodiment in which the clamp adapter 104 is configured to connect the panel rail 110 with a mounting member 112 which may not include a mounting lip 120, or the mounting lip 120 is substantially coplanar with the support surface 118, as shown in FIG. 7F. In these embodiments, the lower flange 144 of the clamp adapter 104 may extending substantially normal to the plane of the clamp body 140 and subsequently positioned under the support surface 118 of the mounting member 112 after assembly, as shown in FIG. 13F. The spring clamp 122 may then capture the support surface 118 and the lower flange 144 within the receiver slots 132. In this embodiment, the clamp adapter 104 may not include a separate indexing tab 158. As discussed previously, the clamp cutout 154 may be shaped to accommodate the various orientations with which the spring clamp 122 may be installed on the clamp adapter 104.

It should be appreciated that although FIGS. 7A-13H depict three variations on the mounting lip 120 angle and associated orientation of the lower flange 144 of the clamp adapter 104, any suitable mounting member with any suitable mounting lip angle may be used. The lower flange 144 of the clamp adapter 104 may accordingly be oriented to accommodate the mounting lip 120 of the mounting member 112. The spring clamp 122 may then be installed at any suitable orientation in order to fix the position and orientation of the mounting member 112 relative to the clamp adapter 104.

Turning to FIGS. 14A-19I, shown therein are embodiments of the clamp adapter 104 that are configured to be deployed in pairs to connect adjacent or proximate panel rails 110 to the same mounting member 112. As indicated in FIGS. 14A-14E, the clamp adapter 104 includes a spacer flange 160 attached to the lower flange 144. In this embodiment, the locking notch 156 is disposed near the spacer flange 160 rather than in the middle of the lower flange 144. When two clamp adapters 104 are brought together such that the spacer flanges 160 are in contact the two clamp adapters 104 can be secured to the mounting member 112 with a single spring clamp 122 (as depicted in FIGS. 15A-15H). The embodiments of the clamp adapters 104 depicted in FIGS. 14A-15H are intended for use in connecting multiple panel rails 110 to a single mounting member 112 that includes a vertical mounting lip 120, using a single spring clamp 122. FIGS. 16A-16I indicates the same embodiment of clamp adapter 104 secured by set screws 124, and electrically bonded to mounting member by bonding barb 162. In contrast, the embodiments of the clamp adapters 104 depicted in FIGS. 17A-19I are intended for use in connection with a mounting member 112 that includes a mounting lip 120 that extends downward at about 45°. The embodiments of the clamp adapters 104 depicted in FIGS. 20A-22I are intended for use in connecting panel rails 110 to a mounting member 112 that does not include a mounting lip 120 or a mounting lip 120 that is coplanar with the support surface 118 of the mounting member 112.

As described previously, in some embodiments, a clamp adapter body may act as a leaf spring. Accordingly, the clamp adapter 104 may be elastically deformed about the rail slot 146 to accommodate a broad range of mounting member sizes and/or angles. As shown in FIG. 23A, in some embodiments, a clearance or vertical height H1 between the lower flange 144 and lateral flange 148 along axis AX1 may be different form (e.g., smaller than) a vertical height H2 of a structure to be received by the clamp adapter 104 (e.g., lower flange 116 of the panel rail 110). Accordingly, the clamp body 140 may be slightly bent in the direction of D1 about the rail slot 146 to better accommodate the greater height H2 of the support surface 118. The opening of the rail slot 146 may reduce the local stiffness of the body 140 to allow the clamp adapter 104 to bend. Given the pre-existing opening in between the lateral flange 148 and lower flange 144, bending the body 140 about the rail slot 146 may increase the vertical height H1. It should be appreciated that in some embodiments, the lower flange 144 may be engaged with a mounting lip of the mounting member, such that bending the body 140 about the rail slot 146 may not significantly bend or elastically deform the lower flange 144.

It should be appreciated that the elastic deformation of the adapter 104 may be dependent upon the shape of the clamp adapter 104 (e.g., the bending between the upper flange 142 and clamp body 140). Accordingly, in some embodiments, the connection between the upper flange 142 and body 140 may be sufficiently rigid, such that bending of the clamp body 140 along direction D1 may increase the vertical height H1 proportionally, without significant plastic deformation of the clamp adapter 104. In other words, the connection of the upper flange 142 and body 140 may be suitably sized to prevent localization of deformation. In this way, the upper flange 142 (and associated lateral flange 148) may rotate about the rail slot 146 to accommodate a variety of different panel rail thicknesses.

Figure 23B:
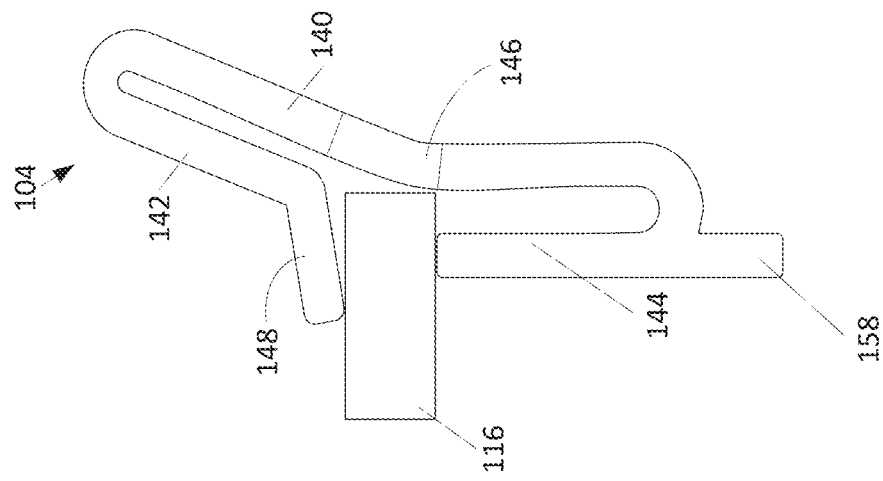
FIGS. 23A-23B present side views of an adapter with a 90° lower flange in the process of being installed on a mounting member.
Figure 23A:
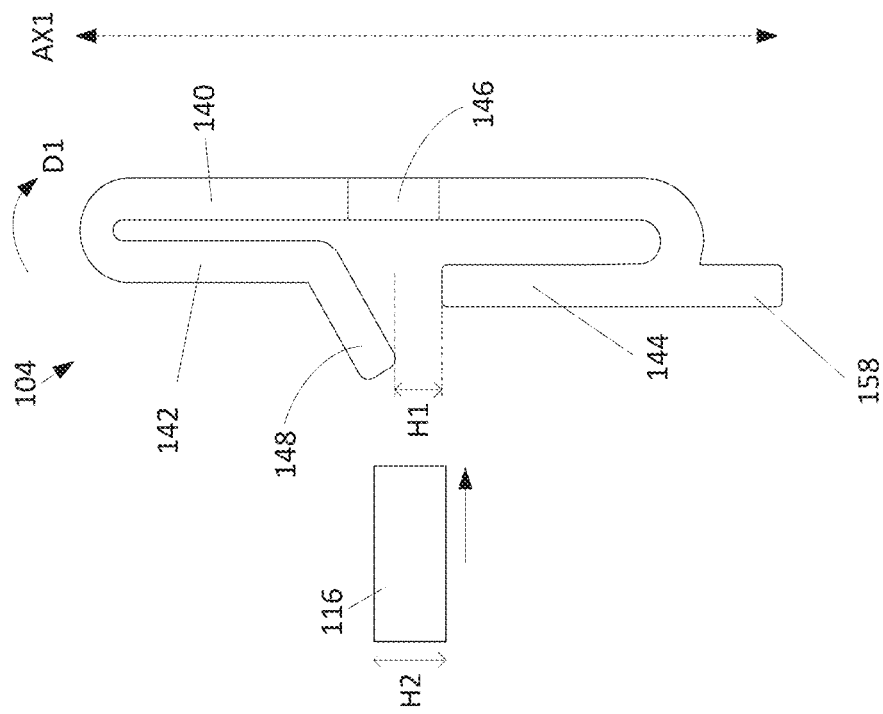

As shown in FIG. 23B, bending the clamp body 140 in the direction of D1 may increase the clearance or vertical height H1 of the clamp adapter 104. In some embodiments, as described previously, this bending procedure may enhance the engagement between the rail slot teeth 152 (see FIGS. 8A-8E) and lower flange 116 of the panel rail 110 to control the bending of the clamp adapter 104. In other words, engagement between the longer rail slot teeth 152 and the lower flange 116 may limit bending of the clamp body 140, keeping the clamp adapter 104 in a tensioned configuration to maintain strong mechanical (and in some embodiments, electrical) contact between the various components. It should be appreciated that the spring-like properties of the clamp body 140 may allow the upper flange 142 to partially spring back after insertion of the lower flange 116 of the panel rail 110, but still remain in a tensioned configuration.

In some embodiments, the bending procedure shown in FIGS. 23A-23B (e.g., tensioned configuration of the leaf spring-like clamp adapter body 140) may enhance the shock-absorbance properties of the adapter 104. In some embodiments, the adapter 104 may be bent manually prior to insertion of the mounting member 112, whereas in other embodiments, the adapter 104 may be bent during the installation of the mounting member 112. It should be appreciated that any of the clamp adapters described herein may exhibit leaf-spring behavior (e.g., elastic bending) similar to those depicted in FIGS. 23A-23B.

It should be appreciated that although the lower flange 144 and lateral flange 148 are depicted to be on the same side compared to the adapter body 140, in some embodiments, the lateral flange 148 may be located on an opposing side of the body 140. In other words, in some embodiments, the cross-section of the clamp adapter 104 may be S-shaped, as opposed to C-shaped, as depicted in FIG. 23A, for example. Of course, the clamp adapters described herein may have any suitable cross-sectional shape and/or size dependent upon the application, and therefore the present disclosure is not limited by the shape of the clamp adapters.

In some embodiments, as depicted in FIGS. 24A-24D, an S-shaped clamp adapter 104 may include a lateral flange 148 located across the adapter body 140 from the lower flange 144. The clamp adapter 104 may also include a spacer flange 160 extending from the lower flange 144, to facilitate the assembly of one or more panel rails to a mounting member. It should be appreciated that clamp embodiments with spacer flanges may be used to assemble one panel rail to one mounting member, as the present disclosure is not so limited. In some embodiments, the clamp adapter 104 may further include rail slot teeth 152 extending from the panel rail slot 146 and lateral flange teeth 150 extending from the lateral flange 148. The clamp adapter 104 may also include a clamp cutout 154 along the adapter body 140 sized to admit a clamping mechanism (e.g., a spring clamp) as well as an indexing tab 158 to control the engagement of said clamping mechanism on the clamp adapter 104.

It should be appreciated that although the clamp cutout 154 and indexing tab 158 are depicted to be centrally located on the adapter body 140, embodiments in which they are off-center are also contemplated.

Figure 25B:
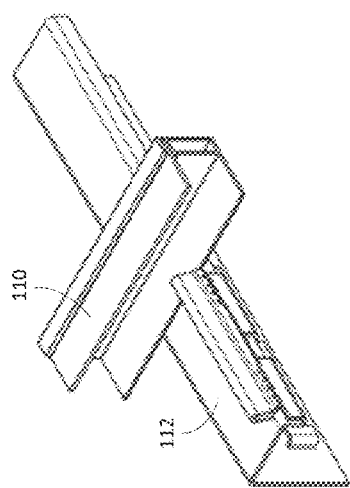
Figure 25A:
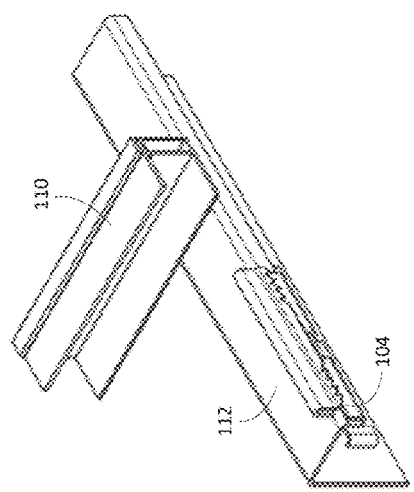
Figure 25A:
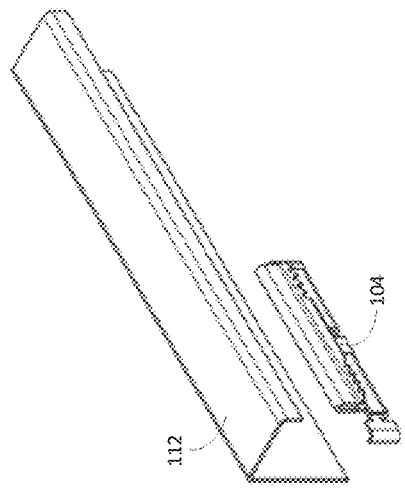
Figure 25C:
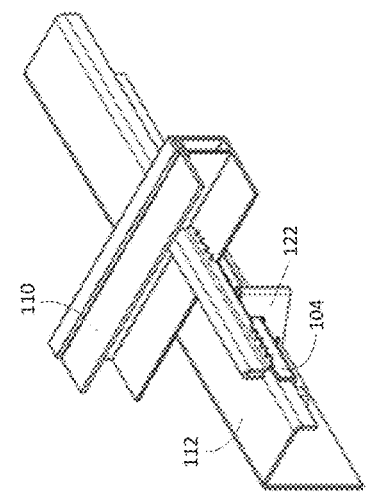
Figure 25F:
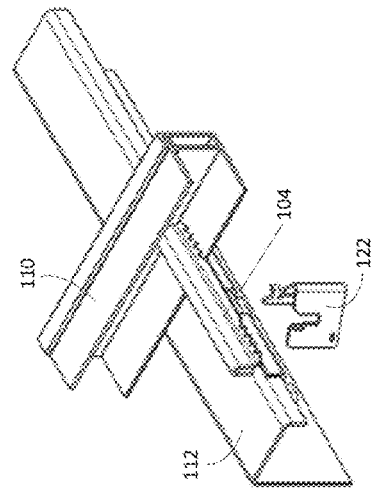

FIGS. 25A-25F depict a process of installing a clamp adapter 104 on a panel rail 110 and mounting member 112 according to some embodiments. First, as shown in FIG. 25A-25B, a clamp adapter 104 is approximated to a mounting member 112 to support the mounting lip of the mounting member 112 as described previously. The panel rail 110 may then be inserted into a panel rail slot of the clamp adapter 104, as shown in FIGS. 25B-25D. In some embodiments, a plurality of pail rail teeth may be in contact with the panel rail 110 at the step shown in FIG. 25D. A spring clamp 122 may then be used to fix the clamp adapter 104, mounting member 112, and panel rail 110 in place, as shown in FIGS. 25E-25F. As described previously, in some embodiments, the spring clamp 122 may engage with an indexing tab of the clamp adapter 104 to ensure proper positioning and extension of the clamp 122.

FIGS. 26A-26E depict the process of installing a clamp adapter 104 on a panel rail 110 and mounting member 112 from FIGS. 25A-25F from the side, depicting the leaf spring-like bending capabilities of the clamp adapter 104. As shown in FIG. 26C, the clamp body of the clamp adapter 104 may be bent in the direction D1 to accommodate the panel rail 110. Upon insertion of the panel rail 110 into the panel rail slot of the clamp adapter 104, the clamp adapter 104 may partially spring back to engage the panel rail with both the rail slot teeth and the lateral flange teeth.

As described previously, the leaf spring-like bending capabilities of the clamp adapter 104 may improve the tolerance range of the clamp adapter 104, accommodating a range of various mounting member thicknesses and mounting lip angles. In some embodiments, the leaf spring-like bending capabilities of the clamp adapter 104 may improve its shock-absorbance properties, by enhancing the engagement between the mounting member 112 and panel rail 110.

Figure 27A:
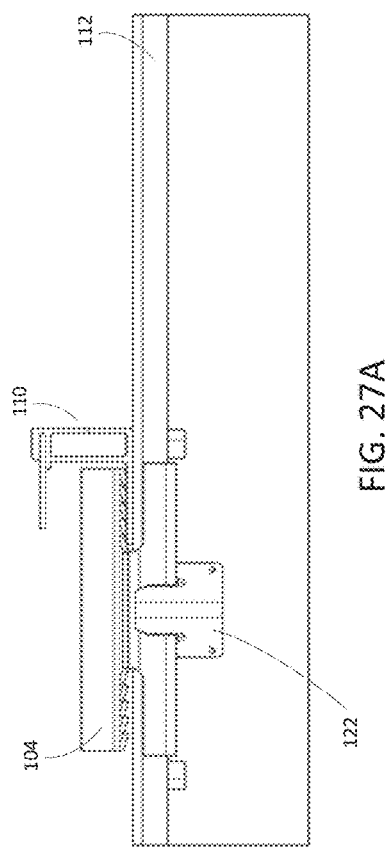
FIGS. 27A-27C present various views of the adapter from FIGS. 24A-24D connecting a PV frame to a mounting member.
Figure 27C:
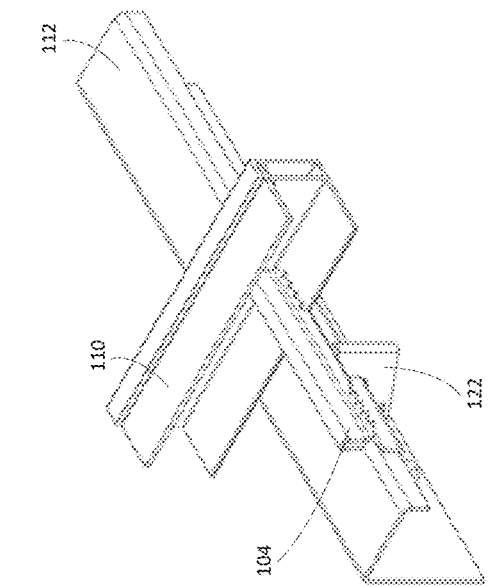
Figure 27B:
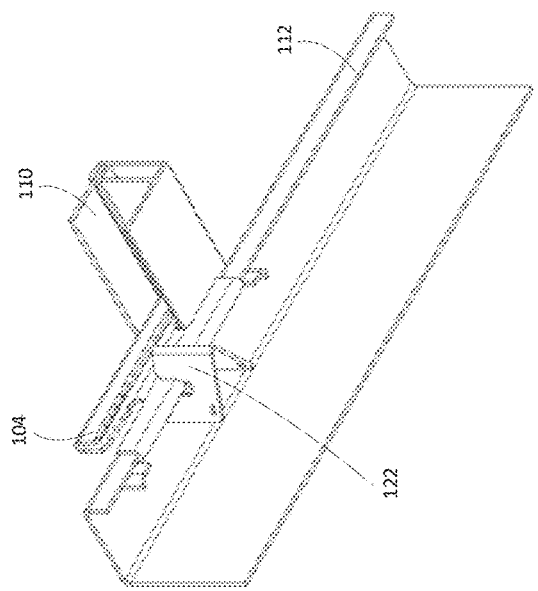

FIGS. 27A-27C depict a clamp adapter 104 connecting a panel rail 110 and a mounting member 112 through a spring clamp 122. The spring clamp 122 may be engaged on a mounting lip of the mounting member 112 through a clamp cutout of the clamp adapter 104 in order to secure the panel rail 110 to the mounting member 112 through the clamp adapter 104.

In some embodiments, the clamp adapter 104 may include more than one set of rail slot teeth and/or lateral flange teeth (e.g., one set of teeth at each end of the clamp adapter 104, as shown in FIG. 24B), but may only engage one set of each teeth with the panel rail 110, as shown in FIG. 27B. In some embodiments, each set of rail slot teeth and/or lateral flange teeth may be engaged on a separate panel rail, such that the clamp adapter may be positioned in between two panel rails. For example, a single clamp adapter may be used to connect one or more panel rail rows (not shown).

Figure 28A:
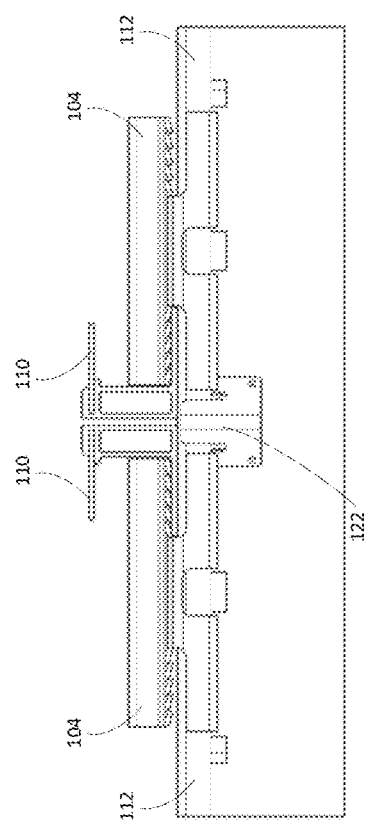
FIGS. 28A-28C present various views of the adapter from FIGS. 24A-24D connecting two PV frames to a mounting member.
Figure 28C:
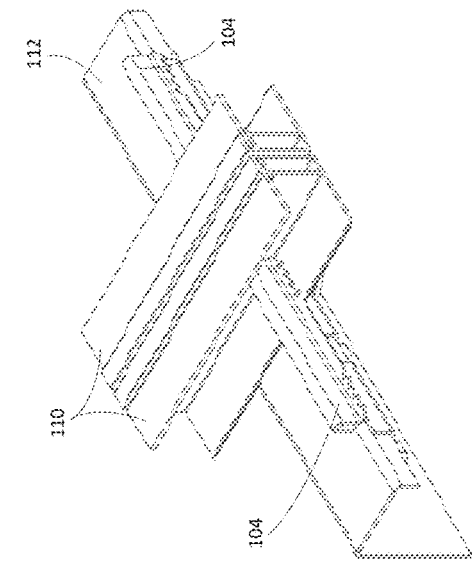
Figure 28B:
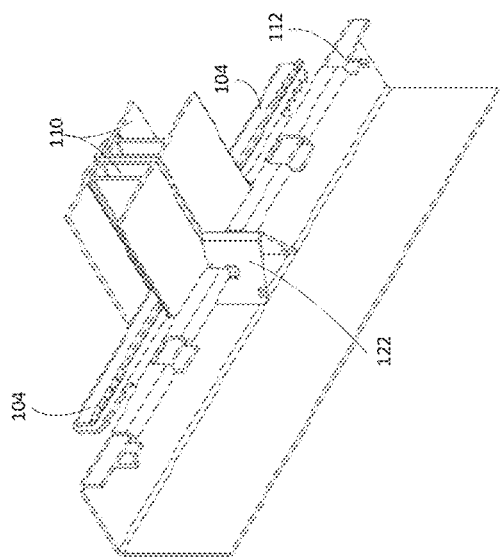

In some embodiments, a pair of clamp adapters 104 may be used in the middle of a panel rail 110 row, as shown in FIGS. 28A-28C. Accordingly, the pair of clamp adapters 104 may share a single spring clamp 122. As discussed previously, each clamp adapter 104 may include one or more spacer flanges (positioned at each end of its clamp body) to engage with the spring clamp 122. In this way, the spring clamp 122 may mechanically couple (e.g., fix) and, in some embodiments, electrically couple (e.g., when the rail slot teeth and/or lateral flange teeth of the clamp adapter scratch the rail panel) the mounting member 112, pair of panel rails 110, and clamp adapters 104.

In some embodiments, the clamp adapter 104, the spring clamp 122, the panel rail 110 and the mounting member 112, and optional set screws 124 collectively provide a "mounting system" that facilitates the attachment of the solar panel assembly 100 to the base assembly 102. The mounting system provides several advantages over the prevailing use of bolt fasteners: (1) the clamp adapter 104 and spring clamp 122 replace several parts needed for a bolted connection; (2) no torque specification is necessary; (3) it is not necessary to align prefabricated bolt holes on the panel rail 110 and mounting member 112; (4) training and quality control requirements are greatly reduced; (5) maintenance costs are substantially reduced because nut tightening and re-torqueing of loose bolts is eliminated; and (6) the clamp adapter 104 and spring clamp 122 can be pre-attached and shipped with the mounting member 112, providing logistic and ergonomic benefits absent in other systems. Further, in most embodiments, the clamp adapter 104 and spring clamp 122 can be installed without the use of tools or modifications to the mounting members.

It should be appreciated that although PV systems are described, the clamp adapters of the present disclosure may be used to connect any suitable clamp to any suitable structure. Accordingly, the clamp adapters of the present disclosure are not limited by the application in which they are employed.

Importantly, although terms of reference such as "horizontal" have been used in this disclosure, it will be understood that the mounting system is equally well suited for securing the solar panel assembly 100 to the base assembly 102 in non-horizontal applications. For example, the clamp adapter 104 and spring clamp 122 can be used to secure the PV panel 200 to a vertically-oriented base assembly 102. It will also be understood that the clamp adapter 104 and other components of the mounting system can be used to connect and assemble structural members used in applications other than supporting solar panels. For example, the clamp adapter 104 and spring clamp 122 may be useful in connecting structural members within the chassis of appliances or to assist with the assembly of metal buildings.

It is to be understood that the present disclosure is not limited in application to the details of methods and apparatus as set forth in the following description. The present disclosure is capable of other embodiments or of being practiced or carried out in various ways. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

What is claimed is:

1. A method of connecting a structure to a bracket, the method comprising:
   receiving a portion of the structure in a rail slot of a clamp adapter;
   receiving and retaining a portion of the bracket in a lower flange of the clamp adapter; and
   fixing a position and orientation of the portion of the bracket relative to a lateral flange of the clamp adapter with a fastener mechanism engaged with the clamp adapter;
   wherein receiving the portion of the bracket in the lower flange urges a lateral flange of the clamp adapter to bend to retain the structure in the rail slot when the structure and the bracket are assembled with the clamp adapter.

2. The method of claim 1, wherein the portion of the structure and the bracket are angled relative to one another when the structure and the bracket are assembled with the clamp adapter.

3. The method of claim 1, further comprising elastically deforming the clamp adapter to receive the structure and the bracket.

4. The method of claim 1, wherein the lower flange is substantially parallel to the portion of the structure when the structure and the bracket are assembled with the clamp adapter.

5. The method of claim 1, wherein the lower flange is angled with respect to the portion of the structure when the structure and the bracket are assembled with the clamp adapter.

6. The method of claim 1, further comprising electrically connecting the structure and the bracket through the clamp adapter.

7. The method of claim 1, further comprising:
   receiving a portion of an additional structure in a rail slot of an additional clamp adapter;
   receiving and retaining a portion of the bracket in a spacer flange of the additional clamp adapter; and
   receiving and retaining a portion of the bracket in a spacer flange of the clamp adapter,
   wherein the clamp adapter and the additional clamp adapter are configured to connect the structure and the additional structure to the bracket.

* * * * *